(12) United States Patent
Kavoori et al.

(10) Patent No.: US 7,039,915 B2
(45) Date of Patent: May 2, 2006

(54) METHOD AND APPARATUS FOR SOFTWARE-BASED ALLOCATION AND SCHEDULING OF HARDWARE RESOURCES IN AN ELECTRONIC DEVICE

(75) Inventors: Chakki Kavoori, San Jose, CA (US); Keith Reiken, Saratoga, CA (US); David M. Holmes, Cupertino, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/750,532

(22) Filed: Dec. 30, 2003
(Under 37 CFR 1.47)

(65) Prior Publication Data

US 2005/0066336 A1    Mar. 24, 2005

Related U.S. Application Data

(63) Continuation of application No. 09/922,484, filed on Aug. 3, 2001.

(60) Provisional application No. 60/222,853, filed on Aug. 3, 2000.

(51) Int. Cl.
G06F 9/46 (2006.01)
G06F 12/00 (2006.01)

(52) U.S. Cl. ........................ 718/104; 707/204

(58) Field of Classification Search ........... 718/100, 718/102, 104; 715/764, 771
See application file for complete search history.

(56) References Cited

U.S. PATENT DOCUMENTS

| | | | |
|---|---|---|---|
| 4,755,987 A | 7/1988 | Lee et al. | |
| 5,446,889 A * | 8/1995 | Prestifilippo et al. | 707/100 |
| 5,471,471 A | 11/1995 | Freeburg et al. | |
| 5,479,397 A | 12/1995 | Lee | |
| 5,745,527 A | 4/1998 | Kelton et al. | |
| 5,777,991 A | 7/1998 | Adachi et al. | |
| 5,825,242 A | 10/1998 | Prodan et al. | |
| 5,828,658 A | 10/1998 | Ottersten et al. | |
| 5,864,300 A | 1/1999 | Cho et al. | |
| 5,907,580 A | 5/1999 | Cummings | |
| 5,991,643 A | 11/1999 | Chao-Cheng | |
| 6,052,605 A | 4/2000 | Meredith et al. | |

(Continued)

FOREIGN PATENT DOCUMENTS

EP    0 582 323 A1    2/1994

(Continued)

OTHER PUBLICATIONS

Kenington, P.B.; "Emerging Technologies For Software Radio"; Apr. 1999, Electronics and Communication Engineering Journal, Institution of Electrical Engineers, London, GB, pp. 69-83, XP000903140.

(Continued)

*Primary Examiner*—Meng-Al T. An
*Assistant Examiner*—Syed J Ali
(74) *Attorney, Agent, or Firm*—Darby & Darby

(57) ABSTRACT

An architecture and method for dynamic resource allocation and scheduling in a communication device is disclosed herein. The method of controlling hardware resources in a communication device having a processor, a computer readable memory, and at least one hardware resource coupled to each other includes several steps. The first step locates a memory address in the computer readable memory that is associated with a first hardware resource. In the next step, control information associated with the first memory address is transmitted to the first hardware resource for it to be operated. In the last step, a pointer associated with the first address that locates a subsequent address for a subsequent hardware resource, is read.

2 Claims, 13 Drawing Sheets

U.S. PATENT DOCUMENTS

| | | |
|---|---|---|
| 6,085,076 A | 7/2000 | Lindsay et al. |
| 6,091,788 A | 7/2000 | Keskitalo et al. |
| 6,608,638 B1 * | 8/2003 | Kodosky et al. ............ 715/771 |

FOREIGN PATENT DOCUMENTS

| | | |
|---|---|---|
| EP | 0 998 056 A2 | 5/2000 |
| WO | WO 97/49199 A2 | 12/1997 |
| WO | WO-99/62194 A1 | 12/1999 |
| WO | WO-00/68803 A1 | 11/2000 |

OTHER PUBLICATIONS

Gunn et al.: "A Low-Power DSP Core-Based Software Radio Architecture"; IEEE Journal on Selected Areas in Communications, vol. 17, No. 4, Apr. 1999, IEEE Inc. New York, USA, pp. 574-590

* cited by examiner

METHOD AND APPARATUS FOR SOFTWARE-BASED ALLOCATION AND SCHEDULING OF HARDWARE RESOURCES IN AN ELECTRONIC DEVICE

CROSS-REFERENCE TO RELATED APPLICATIONS

This application claims priority to the provisional patent application with the following Ser. No. 60/222,853, filed on Aug. 3, 2000, the specification of which is hereby incorporated by reference in its entirety. This application is a continuation of co-pending application Ser. No. 09/922,484, filed Aug. 3, 2001 and published May 23, 2002 under Publication No. US-2002-0062472-A1.

Related applications, which are incorporated herein by reference, are:

"Improved Apparatus and Method for Multi-Threaded Signal Processing," Ser. No. 09/492,634, filed on Jan. 27, 2000, abandoned Nov. 13, 2003.

"Method and Apparatus for Time-Sliced and Multi-Threaded Data Processing in a Communication System," Ser. No. 60/222,007, filed on Jul. 31, 2000; and "Method and Apparatus for Software-Based Allocation and Scheduling of Hardware Resources in an Electronic Device," Ser. No. 60/223,062, filed on Aug. 3, 2000.

TECHNICAL FIELD

The present claimed invention relates to the field of electronic devices. In particular, the present claimed invention relates to an apparatus and a method for managing hardware resources in an electronic device.

BACKGROUND OF THE INVENTION

Electronic communication devices contain a wide range of hardware resources to provide the different signal processing functions necessary to transmit and receive data signals. However, the discrete hardware resources by themselves do not coordinate input data, output data, enabling signals, etc. amongst the wide ranges of hardware resources. Consequently, a need arises for a controller to provide coordination between the wide range of hardware resources in an electronic communication device. Furthermore, the controller should be real time to accommodate a continual real-time flow of input data into the communication device and the resultant processed output data.

One method of controlling the hardware resources is to utilize a hardware-based controller that is designed for the specific application. However, a hardware-based controller can be very inflexible beyond its specific application. In contrast, wireless communication applications continue to proliferate to include such different systems as: fixed wireless, unlicensed Federal Communications Commission (FCC) wireless, local area network (LAN), cordless telephony, personal base station, telemetry, mobile wireless, encryption, and other digital data processing applications. While each of these applications utilizes spread spectrum communications, they generally utilize unique and sometimes incompatible data processing methodologies. Furthermore, new spread spectrum applications will continue to arise while existing spread spectrum applications continue to mature and evolve over time. These observations mean that existing and new spread spectrum applications will frequently use unique and apparently incompatible hardware and software resources, along with different methods of coordinating and operating them.

However, if a communication device implements a controller as an application specific integrated circuit (ASIC), then it can have limited flexibility. For example, if an ASIC controller is designed for a specific number of hardware resources in an electronic device and a specific operating scenario or usage rate of these hardware resources, then it may be difficult to implement the ASIC controller for a different application or operating environment. One solution is to design and implement a new ASIC device for different applications. But this practice of proliferating control devices to accommodate systems with varied standards and protocols can be costly in terms of design, testing, manufacturing, and infrastructure resources. Resultantly, a need arises for a method and apparatus of controlling hardware resources that overcomes the limited flexibility of an ASIC controller in order to accommodate the variation in spread spectrum communication systems.

Besides the application-specific limitation of an ASIC controller, the ASIC controller can have limited flexibility to accommodate performance failures in a system. For example, a controller can be designed to accommodate a very rigid set of performance criteria and protocol status. If even a single hardware resource, which comprises only a small fraction of the overall system, fails, then the overall system may fail because the controller may not be designed to accommodate failure modes. However, this paradigm is wasteful, especially when a very large percentage of the system is fully operational. Furthermore, this paradigm can be inconvenient to remedy as it may require replacement of chips, boards, or higher assembly parts that contain the failed part.

If a controller is designed as a sequential controller, then it can sequentially start and stop a series of hardware resources. After the controller receives a completion signal from a first hardware resource, the controller can then initiate a subsequent hardware resource. Unfortunately, this process can result in a system effect referred to as fragmenting. If hardware resources are left idle while a controller waits for an active hardware resource to complete its operation and send its completion signal to the controller, then the idle hardware does not contribute to the processing efficiency of the overall device. Thus, it is possible that fragmentation will decrease data throughput, while increasing propagation delay for the electronic device. As a result, a need arises for a controller that can overcome the effects of fragmenting the hardware resources that it controls.

An additional situation encountered in real-time operation of an electronic communication device is the frequent change in the device's operating environment or processing needs. For example, a wireless communication system has frequent changes in the number of users (calls are initiated and terminated) and the quality and quantity of signals (e.g., the multipaths signal to noise ratio and strength, quantity of data transmitted, type of data transmitted, etc.). In short, a communication system can be extremely dynamic in many aspects. If an ASIC controller is utilized, its ability to accommodate the changes in the system may be limited to those conceived of during the design of the hardware-based controller. Consequently, its ability to accommodate new variations in system dynamics can be limited. The performance of a controller can also be compromised by inefficient use of hardware resources in the dynamic environment, by system interruptions, system crashes, and compounded fragmenting due to the dynamically changing environment. Thus, a need arises for a controller that can overcome the limitations of, system interruptions, system crashes, compounded fragmenting, and inefficient use of hardware resources due to the dynamically changing environment and other factors. Furthermore, a need arises for a controller that can effectively accommodate the changes in the system without compromising the integrity of the system itself, including processes that have not changed.

However, given their complexity, quantity, and interactive requirements of hardware resources in an electronic device, it would be very difficult to manually and discretely control them individually. And to manually implement changes to the controller of hardware resources would be even more difficult because of possible conflicts and lack of debugging. In short, a user of an electronic device may desire to control the hardware resources and have flexibility in their control, but the user doesn't want the associated difficulty and complications of programming the individual devices themselves. Consequently, a need arises for a method and apparatus of controlling hardware resources that provides user with control and flexibility without the associated complexities and problems.

As with most electronic devices, power consumption can have detrimental effects such as generating heat, affecting lifespan, and consuming limited power resources such as batteries. The aforementioned issues involving flexibility, fragmenting, system compromises, etc. are typically detrimental to the power consumption of the electronic device. Consequently, a need arises for a controller that can overcome the limitations of inefficient management of hardware resources in terms of power consumption. The aforementioned limitations are generally applicable to all electronic devices.

SUMMARY OF THE INVENTION

The present invention provides a method and apparatus that coordinates, via allocation and scheduling, a wide range of hardware resources in an electronic communication device in a real time manner to accommodate a continual real-time flow of input data into the communication device and the resultant processed output data. Additionally, the present invention overcomes the limited flexibility of an ASIC controller in order to accommodate the variation in hardware resources and uses for the wide range of spread spectrum communication systems. The present invention also overcomes the effects of fragmenting hardware resources and the inefficient use of hardware resources, system interruptions and system crashes, and compounded fragmenting due to the dynamically changing environment. Also the present invention accommodates a dynamically changing environment without compromising the integrity of the system for processes that have not changed. And the present invention provides a method and apparatus of controlling hardware resources that provides user control and flexibility without the associated complexities and problems. Finally, the present invention overcomes the limitations of inefficient management of hardware resources in terms of power consumption.

A first embodiment of the present invention provides a method of controlling hardware resources in a communication device having a processor, a computer readable memory, and at least one hardware resource. The method begins with a first step of locating a memory address in the computer readable memory that has operating information for a first hardware resource. The memory address stores information such as semi-static hardware control parameters (flags, parameters, states, or configurations) and dynamic hardware control parameters for operating the hardware resources. In the next step, operating information located by the first memory address is communicated to the hardware resource. In the next step, a memory address, e.g., a pointer, linking the first address to a subsequent address containing information for operating a subsequent hardware resource, is read. By storing operating information of hardware in software and linking this information for multiple hardware resources via linking addresses, the present invention provides flexible resource allocation and scheduling of the hardware resources.

A second embodiment of the present invention provides a method of dynamically changing a controller function for a hardware resource in a communication device having a processor, a computer readable memory, and at least one hardware resource. In a first step, a list of linking addresses, viz. pointers, associated with the hardware resources is received at the communication device. Next, a list of hardware information, e.g., operating, controlling and configuring information, that is respectively associated with hardware resources is received at the communication device. In the next step, a second list of pointers is provided in the computer readable memory based on the first list of pointers. One of the lists of pointers is designated as the active list, with the other list of pointers is designated as the passive list. In the last step, the hardware information hardware resources in the communication device are operated according to the active list of pointers and the list of hardware information. Changes desired to the list of linking addresses are performed on the passive list of pointers while the active list continues to manage the hardware resources. At an appropriate time, the designation for both lists of linking address is instantaneously swapped and the list of linking addresses with the desired changes now operates the hardware resources.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Figure 1A:
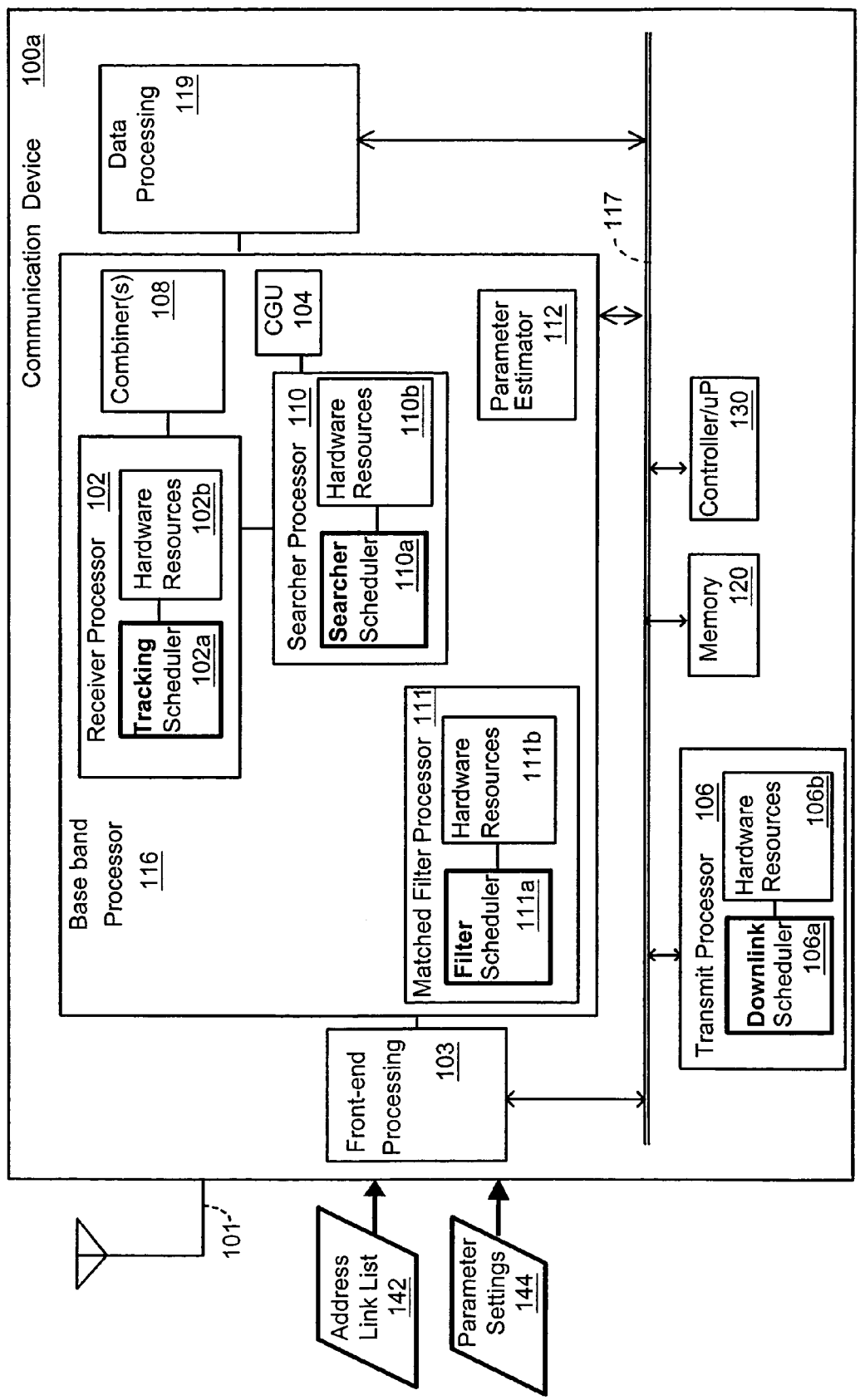
FIG. 1A is a block diagram of an electronic communication device that uses software-based allocation and scheduling of hardware resources, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital communication systems including direct sequence spread-spectrum (DSSS), time division multiple access (TDMA), frequency division multiple access (FDMA) or orthogonal frequency division multiplexing (OFDM) in both wired and wireless applications, as well as other techniques that utilize data processing such as global position satellite (GPS) systems. Data processing is utilized in wireless communications for many functions including, but not limited to: filtering, searching, modulation, demodulation, encoding, decoding, estimating, etc. The systems or techniques which utilize data processing include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, the present invention is applicable to the following exemplary list of digital direct sequence spread spectrum communication applications. One fixed wireless application to which the present invention may be applied is a metropolitan multipoint distribution system (MMDS). Examples include wireless cable broadcast, or two-way wireless local loop (WLL) systems. Some examples of a W-LAN, that can communicate digitized audio and data packets, for which the present invention can be applied, include Open Air and the Institute of Electrical and Electronics Engineers (IEEE) specification 802.1 1b. In yet another application, a specific example of an unlicensed FCC application to which the present invention may be applied include the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1EXTREME, or other user-defined protocols. The range of code sequences utilized in the exemplary spread spectrum applications disclosed herein, are useful to define the class of functions for which the present configurable code generator unit is applicable. The present invention can also be utilized in any electronic device needing to control hardware resources.

The detailed description of the present invention begins with a description of a spread-spectrum communication device, in FIG. 1A, that uses software-based allocation and scheduling of hardware resources. Next, the components of an exemplary processor, e.g., the tracking processor, that uses software-based allocation and scheduling of hardware resources is described in FIG. 1B. A description of the reuse of hardware resources in an electronic device to improve device efficiency is described through the timeline graph of FIG. 1C. The detailed description continues with a higher-level system, in FIG. 2A, for configuring the software-based allocation and scheduling of hardware resources in a communication device. A computer used to generate code for software-based allocation and scheduling of hardware resources in a communication device is described in FIG. 2B. The function implemented by the computer of FIG. 2B that generates code for software-based allocation and scheduling of hardware resources is then described in FIG. 2C. An exemplary table of computer memory fields that store code for software-based allocation and scheduling of hardware resources is described for FIGS. 3A through 3D. Thereafter, multiple processes associated with the software-based allocation and scheduling of hardware resources in an electronic device are described in FIG. 4A through FIG. 4C. In particular, the processes for operating, generating code for, and dynamically changing the software-based allocation and scheduling of hardware resources in an electronic device are described therein.

Communication Device

Referring now to FIG. 1, a block diagram of an electronic communication device that uses software-based allocation and scheduling of hardware resources is shown in accordance with one embodiment of the present invention. Electronic communication device 100a provides an exemplary application of the present invention in a wireless direct sequence spread spectrum (DSSS) base transceiver station (BTS).

Communication device 100a includes a receiver processor 102, a transmit processor 106, a searcher processor 110, and a matched filter processor 111. Receiver processor 102 includes tracking scheduler 102a coupled to hardware resources 102b. Transmit processor 106 includes downlink scheduler 106a coupled to hardware resources 106b. Similarly, searcher processor 110 includes searcher scheduler 110a coupled to hardware resources 110b while matched filter processor 111 includes filter scheduler 111a coupled to hardware resources 111b. Each scheduler 102a, 106a, 110a and 111a provides respective a software-based scheduler/allocator of hardware resources 102b, 106b, 110b, and 111b. The details of the components and processes for software-based allocation and scheduling of hardware resources are described in more detail in subsequent hardware figures and flowchart figures.

Communication device 100a also includes an antenna 101, a front-end processing block 103, a base band processing block 116, a data processing block 119, a microprocessor 130, a memory block 120, and a bus 117. Front-end processing block 103 is coupled to base band processing block 116, both of which are coupled to microprocessor 130 and memory block 120 via bus 117. Microprocessor 130 and memory block 120 support the exchange of data, control, or status information between the various components of communication device 100a. Base band processor block 116 is coupled to front-end processing block 103 and is provided to receive signals while transmit processor block 106 is provided to transmit signals.

Front-end processing block is coupled to antenna 101 to receive a wireless signal. Front-end processing block includes components and functions known to those skilled in the art. Data processing block 119 performs functions such as decoding, etc., that are performed by a codec device, and other components known by those skilled in the art. These components are not shown in data processing block 119 for purposes of clarity.

Base band processing block 116 is operable to process the band of frequencies of the signal delivered by a source, e.g., via front end processing and antenna 101. Base band processing block 116 includes a code generator unit (CGU) 104, a searcher processor block 110, a parameter estimator block 112 and a combiner block 108 all coupled to the receiver processor block 102. CGU 104, combiner(s) 108, and parameter estimator 112 have components and provide functions that are known by those skilled in the art. For example, receiver processor 102 performs despreading and demodulation functions known by those skilled in the art, while searcher processor 110 provides searching and filtering functions known to those skilled to locate signals. Transmit processor 106 performs modulation functions known by those skilled in the art. Matched filter processor 111 performs detection functions.

Controller information to operate tracking scheduler 102a, downlink scheduler 106a, and searcher scheduler 110a, are provided by address list input 142, and hardware parameters input 144. The delivery of the inputs can be provided by a variety of different sources and mediums, as described in subsequent figures.

Hardware resources 102b, 106b, 110b, and 111b are applied to a single computation process within a given system cycle in one embodiment. However, in another embodiment, hardware resources 102b, 106b, 110b, and 111b can be enhanced by running them at a clock rate higher than that required by a process in a given system cycle. That is, the hardware resources can be operated at a frequency that is higher than the data rate for a communication protocol implemented on communication device 100a. In this manner, resources of individual computation components, a receiver processor, can be time-shared across multiple computation processes, e.g., several multipaths and/or multiple channels. Additional information on the design and implementation of configurations into a configurable communication device is provided in co-pending U.S. patent application Ser. No. 09/492,634 entitled "Improved Apparatus and Method for Multi-Threaded Signal Processing" by Subramanian et al., filed Jan. 27, 2000. This related application is commonly assigned, and is hereby incorporated by reference. More detail on time-sharing of hardware resources is described in FIG. 1C. By using the software-based allocation and scheduling of hardware resources, communication device 100a benefits from flexible and dynamic use of hardware resources that saves power, improves performance, allows changes of controlling algorithms, and provides extended lifespan of the device.

Communication system 100a provides an exemplary embodiment of the present invention, which is well suited to alternative embodiments. For example, in other embodiments, communication system 100a is a mobile handset user equipment (UE), an embedded modem, or other communication device in another code-dependent application. Furthermore, the present invention is applicable to any electronic device utilizing data processing operations.

Transmit processor 106, receiver processor 102, searcher processor 110, and matched filter processor 111 are exemplary processors used in communication device 100a. In another embodiment, software-based allocation and scheduling of hardware resources can be applied to any function or quantity of hardware resources in an electronic device, as appropriate for a given application. Matched filter (MF) can also be referred to as a preamble detection engine (PDE).

Figure 1B:
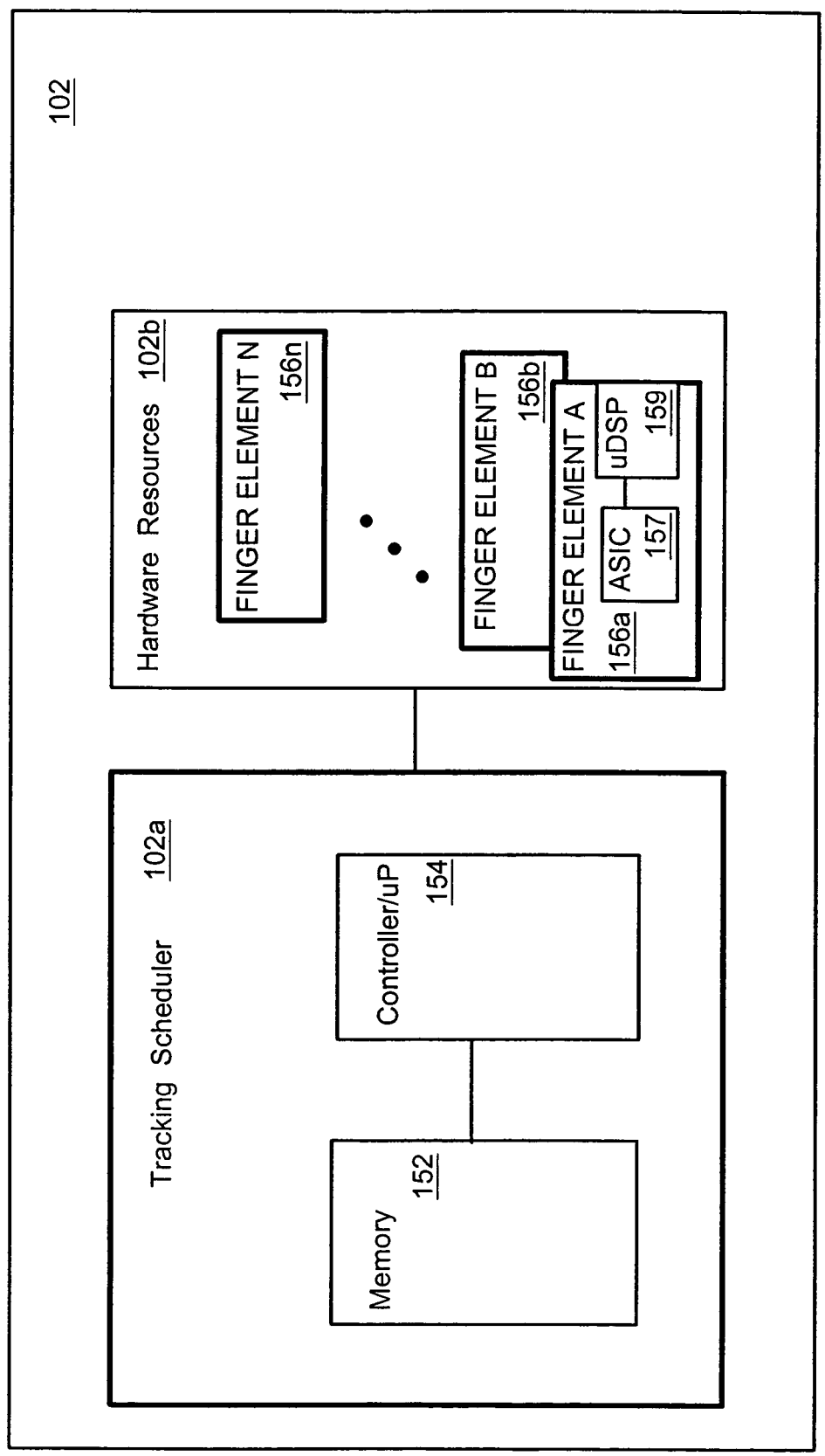
FIG. 1B is a block diagram of the components of a tracking processor that uses software-based allocation and scheduling of hardware resources, in accordance with one embodiment of the present invention.

Referring now to FIG. 1B, a block diagram of the components of a tracking processor that uses software-based allocation and scheduling of hardware resources, in accordance with one embodiment of the present invention. Components of receiver processor 102 are described in FIG. 1B as exemplary components of a software-based allocator/scheduler of hardware resources.

Tracking scheduler 102a includes a memory block 152 coupled to a controller, or microprocessor (uP), block 154. Memory block 152 and uP block 152 have conventional construction known to those skilled in the art in the present embodiment. For example, memory can be any kind of suitable memory such as flash memory, non-volatile memory, registers etc. By using a local controller 154, receiver processor 102 can operate quasi-autonomously from the balance of communication device 100a of FIG. 1A, and thereby reduce overhead and avoid interrupts.

Hardware resources 102b in the case of the tracking scheduler include multiple finger elements A 156a, B 156b, through finger element N 156n, where N is an arbitrary value depending upon the design of a system. The hardware resources can be any quantity and any function as needed by a given application. In one embodiment, N=3 for three finger elements, one each for early, on time, and late finger despreader/demodulators. The finger elements are conventional fingers in the present embodiment, as is well known in the art. The fingers have appropriate selectable interfaces and parameterizeable interfaces to communicate enabling, control, state, and data signals from software in memory 152. The software-based allocation and scheduling of hardware resources is implemented by resident software in memory 152 being executed on controller 154 to allocate and schedule hardware resources 102b, e.g., the individual finger elements 156a through 156n. More than one table in memory 152 can be used to track and/or allocate the hardware resources in a given scheduler. This process is described in more detail in subsequent figures.

Tracking scheduler 102a is also referred to as an allocator, as described in co-pending U.S. patent application Ser. No. 09/772,584 entitled "A Wireless Spread Spectrum Communication Platform Using Dynamically Reconfigurable Logic", by Subramanian et al., filed Jan. 29, 2001. Additional information on the design and implementation of configurations into a configurable communication device is provided. This related application is commonly assigned, and is hereby incorporated by reference.

Elements 156a through 156n of hardware resource 102b include a conventional ASIC portion 157 coupled to a programmable and distributed micro digital signal processing units (micro DSP) 159 in the present embodiment. Both types of devices are coupled together to perform a desired function. The uDSP can perform repetitive functions, e.g., math operations, useful for a given application while the ASIC performs more function specific tasks for finger element 156a. Additional information on the content and function of a uDSP is provided in co-pending U.S. patent application Ser. No. 60/220,295 entitled "Distributed Micro Instruction Set Processor Architecture for High-Efficiency Signal Processing" by Chen et al., and filed Jul. 24, 2000. This related application is commonly assigned, and is hereby incorporated by reference. In another embodiment, elements of hardware resources 102b can be either all ASIC or all uDSP or any combination thereof.

In another embodiment, hardware resources 102b, e.g., finger elements 156a through 156n, are limited to performing a single communication protocol, while in another embodiment, hardware resources are configurable to perform any one of a wide range of communication protocols. For example, co-pending U.S. patent application Ser. No. 09/751,783, entitled "A Configurable All-Digital Coherent Demodulator System for Spread Spectrum", by Ravi Subramanian, filed Dec. 29, 2000, is configurable to accommodate a wide range of communication protocols. This related application is commonly assigned, and is hereby incorporated by reference.

Figure 1C:
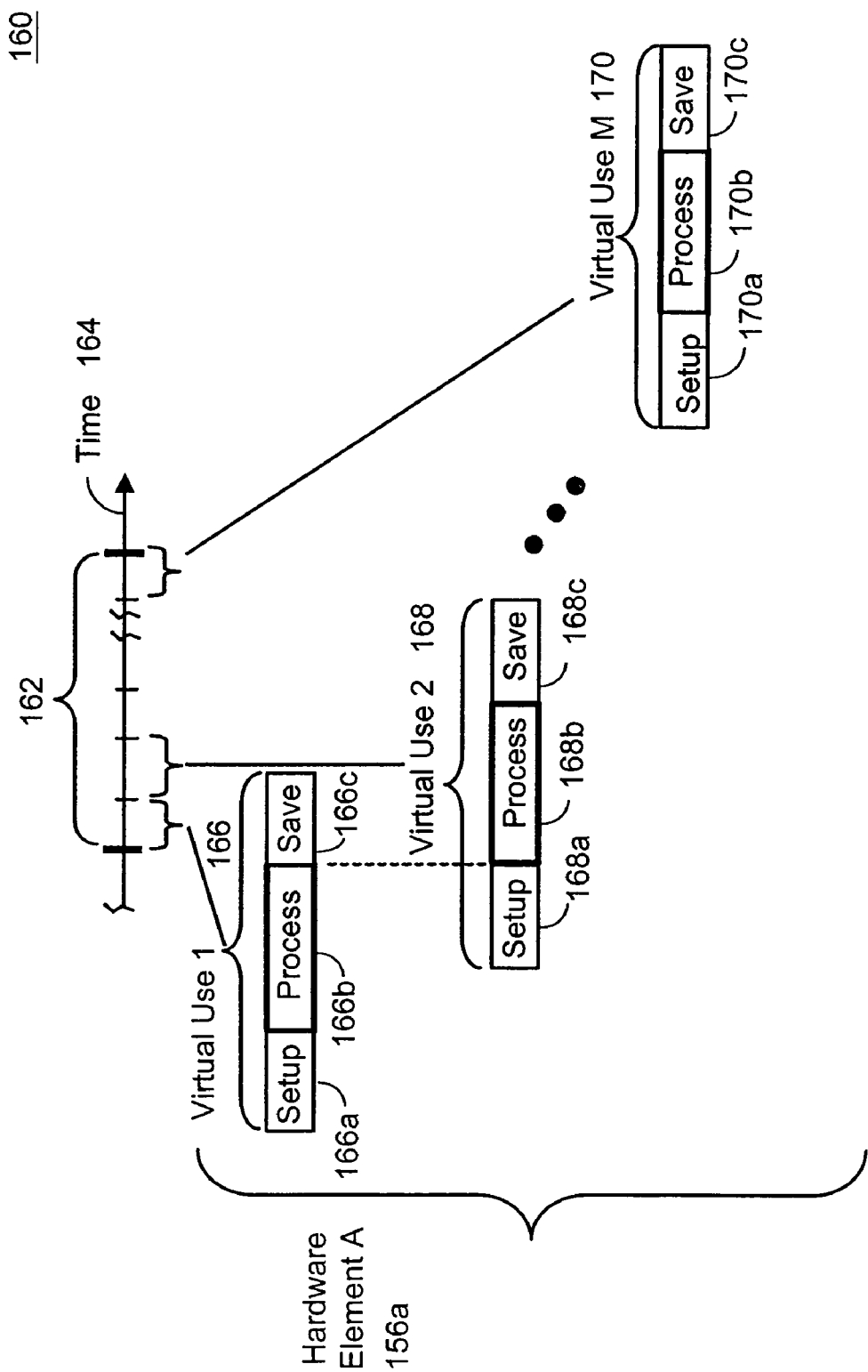
FIG. 1C is a graph of time showing multiple processing cycles within a given system cycle for the reuse a hardware resource, in accordance with one embodiment of the present invention.

Referring now to FIG. 1C, a graph of time showing multiple processing cycles within a given system cycle for the reuse of a hardware resource, in accordance with one embodiment of the present invention. Graph 160 provides an exemplary embodiment of implementing a scheduler to control hardware resources multiple times within a system cycle to obtain higher efficiency and throughput of data.

System cycle 162 is defined by a given application. For example, a communication protocol can have a system cycle with 2560 chips. However, the present invention is well suited to any length of system cycle that is defined by any variable, e.g., time, quantity of data, occurrence of events, etc. Each of the multiple virtual uses, 166, 168, through 170 of a single physical resource, e.g., hardware element A 156a, within a given cycle, e.g., a system cycle 162, can be referred to as a virtual resource. Even though only one physical resource exists, its use for multiple contexts, e.g., users, occurs within a given period of time, e.g., cycle 162, and thus appears to be a resource that is operating in parallel to an observer that simply looks for a result in a period of a system cycle. However, virtual uses actually occur in series as shown by the sequential nature of process 166b, 168b through 170b. Hardware element A is a physical finger element A 156a of FIG. 1B in the present embodiment.

Multiple processing steps shown in FIG. 1C range from virtual use 1 to virtual use M of hardware element A, where M is any value. In one embodiment, hardware element A 166a is a finger A 156A of hardware resource 102a of FIG. 1B. As shown, the clock speed of the hardware resources is relative to the system cycle and the number of intended uses, along with overhead and latency conditions. In equation form, this relationship is expressed as:

Hardware Resource Clock Freq=(1/System Cycle)×(M uses)  Equation [2]

As an example, virtual use 1 166 can be for a first user requiring processing of a system cycle worth of on-time data in a finger, while virtual use 2 can be for a second user requiring processing of a system cycle worth of late data in a finger; and virtual use M can be a third user requiring processing of a system cycle worth of on-time data in a finger. Because all three are simultaneously needing data processing during a given system cycle and because flexible scheduler allows the reuse of hardware in real-time, e.g., as the system is operating, the present invention provides concurrent processing with a limited quantity of hardware to achieve a scale of efficiency.

Each virtual use includes a setup stage 166a, a process stage 166b and a save stage 166c. In the present embodiment, the setup stage of one use overlaps in time, that is to say it operates in parallel, to a processing stage of another use. In this manner, the processing stages of sequential uses can be aligned to provide maximum processing use of hardware resources. The virtual use process is repeated in parallel for as many hardware resources are activated by a user or by the communication device. Thus, the total number of virtual resources of all hardware elements is M uses, of FIG. 1C times N elements of hardware resources 102b of FIG. 1B. In equation form, this relationship is expressed as:

Quantity of Virtual Resources=(M uses)×(N hardware resources).  Equation [1]

By reusing hardware, a given system can be tailored to individual needs by scaling the clock rate and thereby the virtual resources created by the multiple processing cycles with a given system cycle. M can be any value for a given application. The greater the number of virtual resources required, the higher a clock rate for the resource can be scaled. Also, the greater the number of virtual resources, the greater the amount of memory required to store context data save from one virtual use, and used to setup the virtual use for the next system cycle. Because each virtual use of a given hardware element is completed within a given system cycle, they appear to be performed in parallel as concurrent operations, though only a single hardware resource is used. More information on time-sharing of hardware resources is described in co-pending U.S. patent application Ser. No. 60/222,007 entitled "Method and Apparatus for Time-Sliced and Multi-Threaded Data Processing in a Communication System," by Rieken et al., filed Jul. 31, 2000. This related application is commonly assigned, and is hereby incorporated by reference. Additional information is also provided in co-pending U.S. patent application Ser. No. 09/492,634 entitled "Improved Apparatus and Method for Multi-Threaded Signal Processing" by Subramanian et al., filed Jan. 27, 2000. This related application is commonly assigned, and is hereby incorporated by reference.

The present invention is well suited to using any quantity of virtual uses for any time period desired, for any hardware element and for any system cycle condition. Furthermore, alignment of processing, setup, and save stages can have a wide range of alignment features, overlapping, no overlapping, staggered, etc. as appropriate for a given application. Additionally, the quantity of virtual uses does not have to consume the entire system cycle, 162. For example, a wait feature can be implemented to hold the processing of virtual hardware resources until the next system cycle when new data will be available.

System for Configuring Controller

Figure 2A:
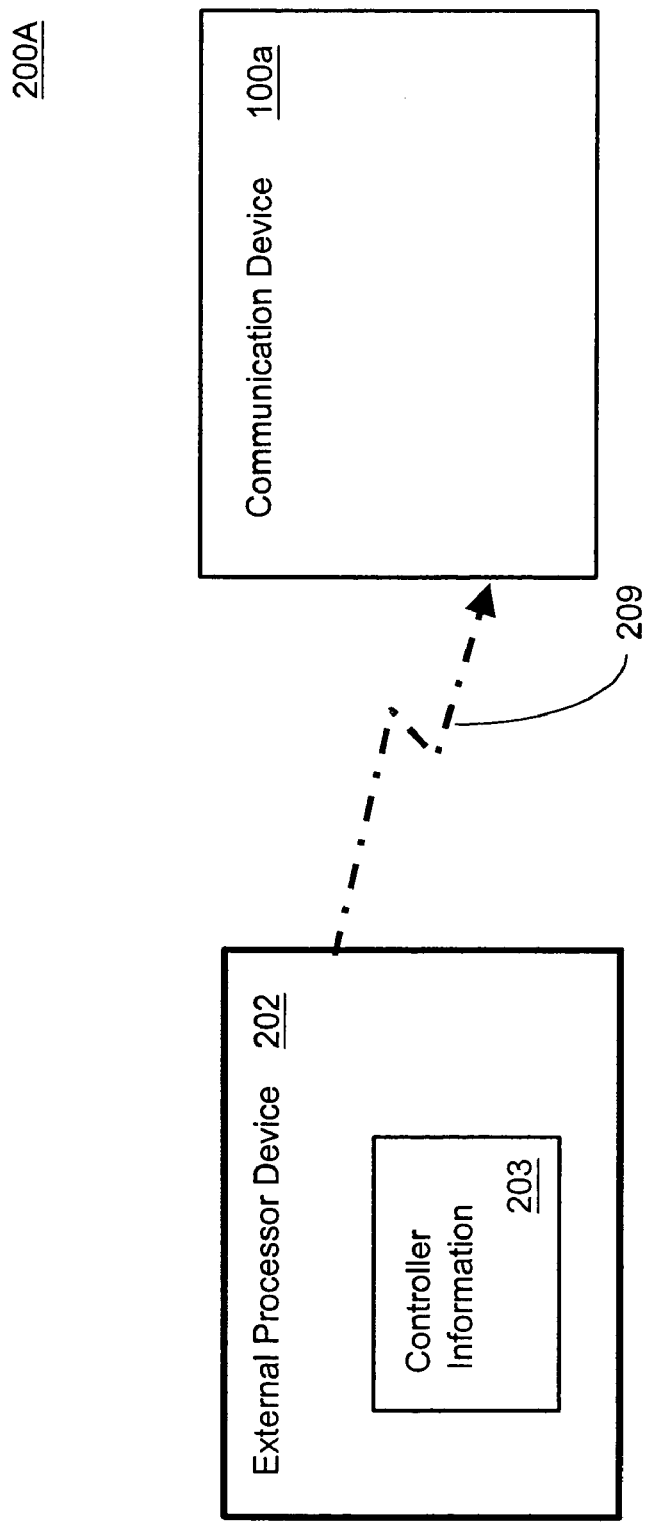
FIG. 2A is a block diagram of a system for configuring the software-based allocation and scheduling of hardware resources in a communication device, in accordance with one embodiment of the present invention.

Referring now to FIG. 2A, a block diagram of a system for configuring the software-based allocation and scheduling of hardware resources in a communication device is shown, in accordance with one embodiment of the present invention. The system allows a user to have control over configuration of the controller in the communication device. In this manner, the performance of the communication device can be adapted to local and changing communication protocols, environments, or business models, thereby enhancing value and longevity of the communication device.

Configuration system 200a includes an external processor device 202 and a communication device 100a, linked by a wireless or wired medium 209. One embodiment of communication device 100a is presented in FIG. 1A. External processor device 202 is a computer workstation in the present embodiment that includes controller information 203 stored in memory.

Components for communication device 100a are shown in FIG. 1A and not repeated here for purposes of clarity. The operation of device 202 is discussed in a subsequent flowchart. Controller information 203 from external processor device 202 is communicated o configurable communicating device by interface 209. Interface 209 is a wired communication link that couples external processor device 202 and configurable communication device 100a in one embodiment. However, in another embodiment, interface 209 is an electronic storage medium, e.g., CD-ROM and host device, which provides configuration information 203 to configurable communication device 100a. In yet another embodiment, interface 209 is a wireless transmission from external processor device 202, or another communication device, e.g., a wireless base station or wireless test platform. In another aspect of the present invention, configuration information is provided at the time configurable communication device 100a is manufactured and/or initially programmed for operation in the field, for the present embodiment. However, in another embodiment, configuration information is dynamically implemented at a time configurable communication device 100a is in operation in the field.

Figure 2B:
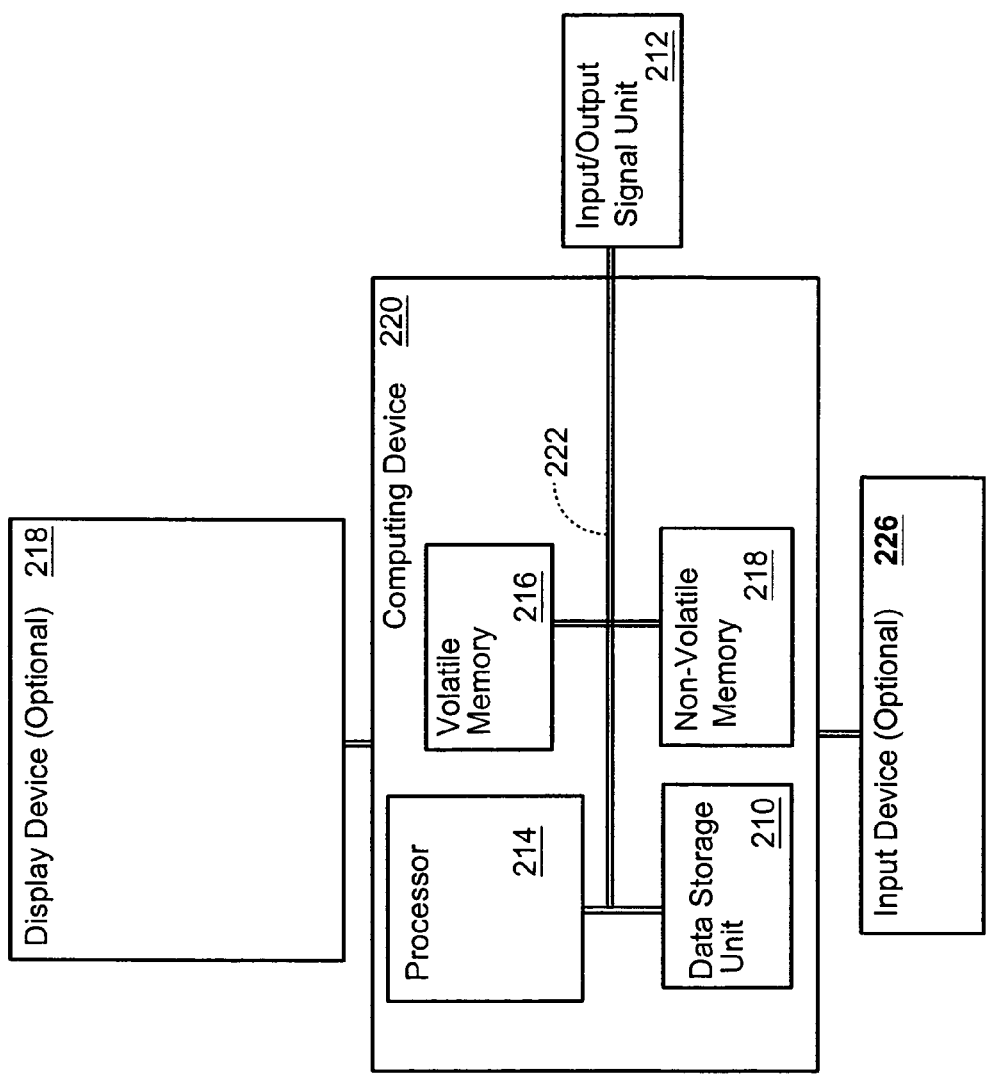
FIG. 2B is a block diagram of a computer used to generate code for software-based allocation and scheduling of hardware resources communication device, in accordance with one embodiment of the present invention.

Referring now to FIG. 2B, a block diagram of a computer used to generate code for software-based allocation and scheduling of hardware resources communication device is shown, in accordance with one embodiment of the present invention. FIG. 2B provides one embodiment of external processor device (computer) 202 of FIG. 2A. By using computer 202, the present invention can process user information to generate a desired controller configuration for a data processing device such as communication device 100a of FIG. 1A.

Computer system 202 includes a core computing device 220 which includes a control/data bus 222 for communicating information, a central processor unit 214 for processing information and instructions, coupled to bus 222, and a memory unit 216 for storing information and instructions, coupled to bus 222. Memory unit 216 can include memory configuration such as random access memory (RAM) for storing temporal information and instructions for central processor unit 214. Complementally, non-volatile memory 218 can include a memory configuration that is read only memory (ROM), for storing static information and instructions for central processor unit 214. Data storage unit 210 can store program instructions and large data base type information.

Computer system 202 also includes an optional display device 218. Display device 218 can be any type of display, such as an analog or a digital display unit. Computer system 202 also includes an optional input device 226 that is coupled to bus 222. Optional input device 226 can include any input device, e.g., an alphanumeric input device such as a keyboard, or a cursor control device such as a mouse, etc. Optional input/output signal unit device 212 provides a communication interface from computer system 202, e.g., serial port, etc.

Bus 222 provides an exemplary coupling configuration of devices in computer system 120a. Bus 222 is shown as a single bus line for clarity. It is appreciated by those skilled in the art that bus 222 can include subcomponents of specific data lines and/or control lines for the communication of commands and data between appropriate devices. It is further appreciated by those skilled in the art that bus 222 can be a parallel configuration, a serial configuration, and that bus 222 can include interconnects, gateways, and/or translators as appropriate for a given application.

It is also appreciated that computer system 202 is exemplary only and that the present invention can operate within a number of different systems such as a general purpose computer system, a dedicated work station, an embedded control system, etc. Furthermore, the present invention is well suited to using a host of intelligent devices that have similar components as exemplary computer system 202.

By using the computer, the appropriate outputs can be quickly and accurately generated from the inputs. Thus, many tasks, e.g., timing estimates, formatting, debugging, etc., can be automated for the development of a controller scheduler. With a GUI, these tasks can also be menu driven, thereby enhancing user convenience.

Figure 2C:
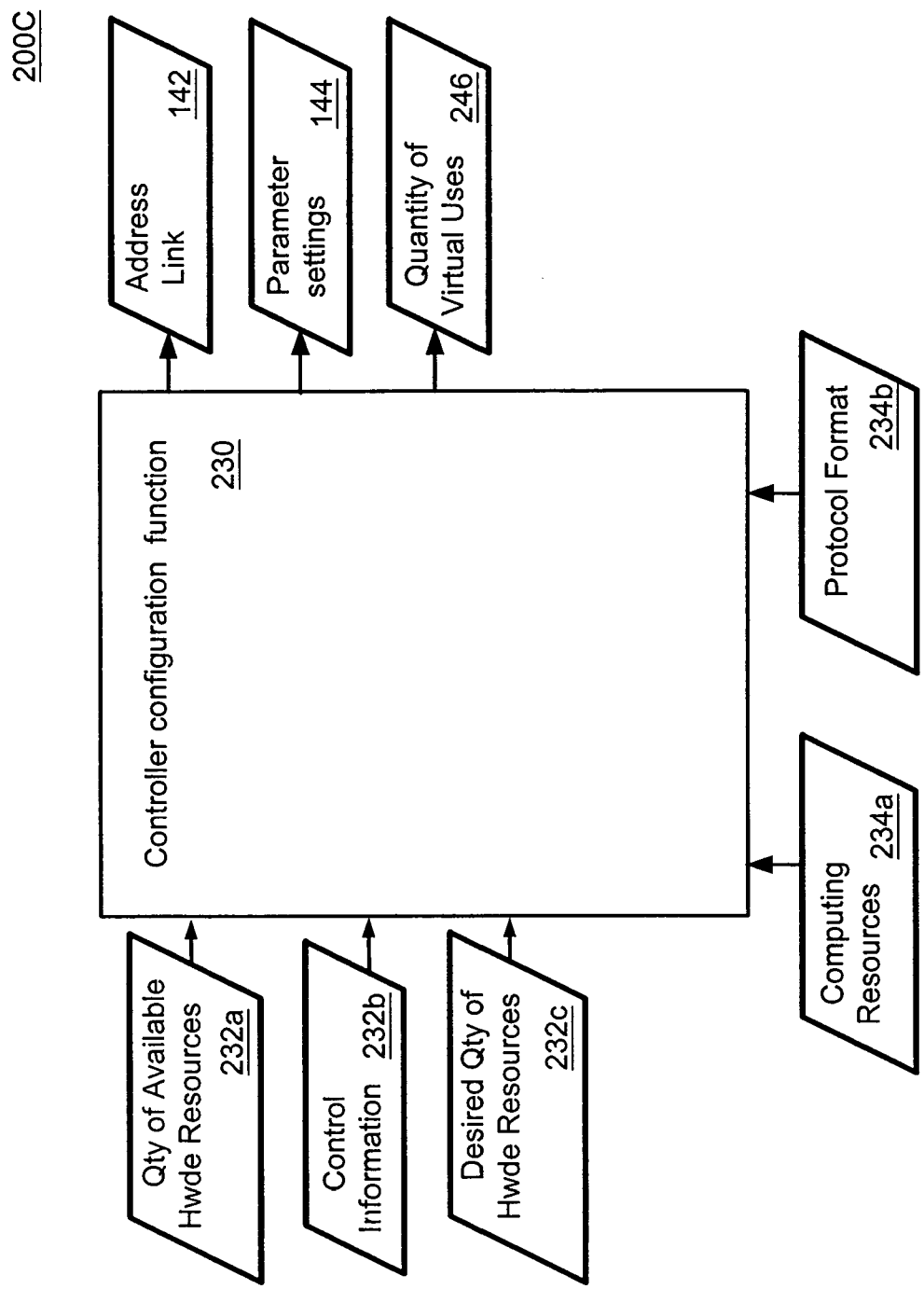
FIG. 2C is a block diagram of a function that generates code for software-based allocation and scheduling of hardware resources, in accordance with one embodiment of the present invention.

Referring now to FIG. 2C, a block diagram of a function that generates code for software-based allocation and scheduling of hardware resources, in accordance with one embodiment of the present invention. Function 230 enables the generation of a controller configuration by evaluating trading off and reconciling desired settings versus resources.

Function block is implemented on exemplary computer system 202 of FIG. 2B in the present embodiment. However, it can be implemented on any electronic device having a processor and memory sufficient to accommodate the controller commands of a given application.

Function block 230 performs a host of sub functions including but not limited to: receiving inputs, reconciling inputs with each other, structuring data, formatting data, debugging data, and outputting data. Inputs provided to controller configuration function 230 include a quantity of available hardware resources 232a, control information 232b, desired quantity of hardware resources 232c, computing resources 234a, and protocol format 234b in the present embodiment.

With respect to input 232a, a quantity of available hardware resources 232a can be provided to function 230. For example, 'N' instances are available for exemplary hardware resources 102b of FIG. 1B. The quantity of available uses includes virtual uses of physical hardware resources, as illustrated in FIG. 1C. The specific partitioning of physical hardware resources and virtual uses thereof can be hidden from a user in one embodiment. The virtual resource is identical to physical resource from a user perspective when the management of the virtual resource is performed by software controls as described herein.

Any quantity of available hardware resources can be provided as input 232a, provided it exists in a given application, or as artificially designated by some higher-level management of hardware. The desired quantity of hardware resources 232c may be derated, e.g., at output quantity of virtual uses 246, from the maximum possible resources for accommodating anticipated volume growth in the future, for accounting for normal degradation of device performance over time, or for different quality of service levels. A default value may be set for any of the above cases.

Input of control information 232b includes information related to implementing parameters for hardware resources via the software controller. For example, control information can include overhead information and sequencing information of multiple virtual uses, such as the overlapping stages shown in FIG. 1B. Control information can indicate configuration settings for configurable hardware resources in order to conform to a desired one of many possible communication protocols, e.g., as described in FIG. 1B. Control information can include user-defined parameters, performances and proprietary and non-proprietary algorithms including information such as threshold values, coefficient values, filter order, etc. The control information input 232b can include management algorithms that account for dynamic changes in control of the flexible scheduler. For example, the conditions under which a hardware resource, such as a finger, is dropped and thus skipped by the controller may be indicated in the control information input. This input can affect quality of service provided by the communication device, as well as other performance metrics. The dynamic implementation of the control information is explained in subsequent tables and flowcharts.

Input of desired quantity of hardware resources 232c is provided by the user as any value equivalent or less than the maximum number of resources available in the system in one embodiment defined by input 232a. Similarly, input of computing resources 234a accounts for any one of many possible computing resources used in a data processing device for which flexible control is desired. For example if a power PC processor is utilized as the host microprocessor 130 of communication device 100a of FIG. 1A, then control information that interacts appropriately with the constraints and special commands of the power PC processor are provided to the function.

Protocol format input 234b provides protocol format, which includes the appropriate word lengths and structure appropriate for the memory, e.g., 152, used in tracking scheduler 102a. More information is provided on the specific structure of the memory and information stored thereon for controlling, in subsequent FIGS. 3A and 3B.

Address link output 142 provides the formatting and instructions for generation of a software-based allocator/scheduler in a communication device, e.g., 100a of FIG. 2A. Parameter settings output 144 provides the appropriately formatted user-desired settings obtained from control information input 232b, for the desired hardware resource.

The controller configuring function 230 can be used for any quantity of functions controlled by a dynamic scheduler in a given data processing device, assuming the appropriate inputs, protocol format, etc. reflect the instant hardware resource. The inputs/outputs shown in FIG. 2C are exemplary, and greater or fewer inputs and outputs can be provided for either a more fixed or predetermined design or a more flexible design.

Controller Memory Layout

Figure 3A:
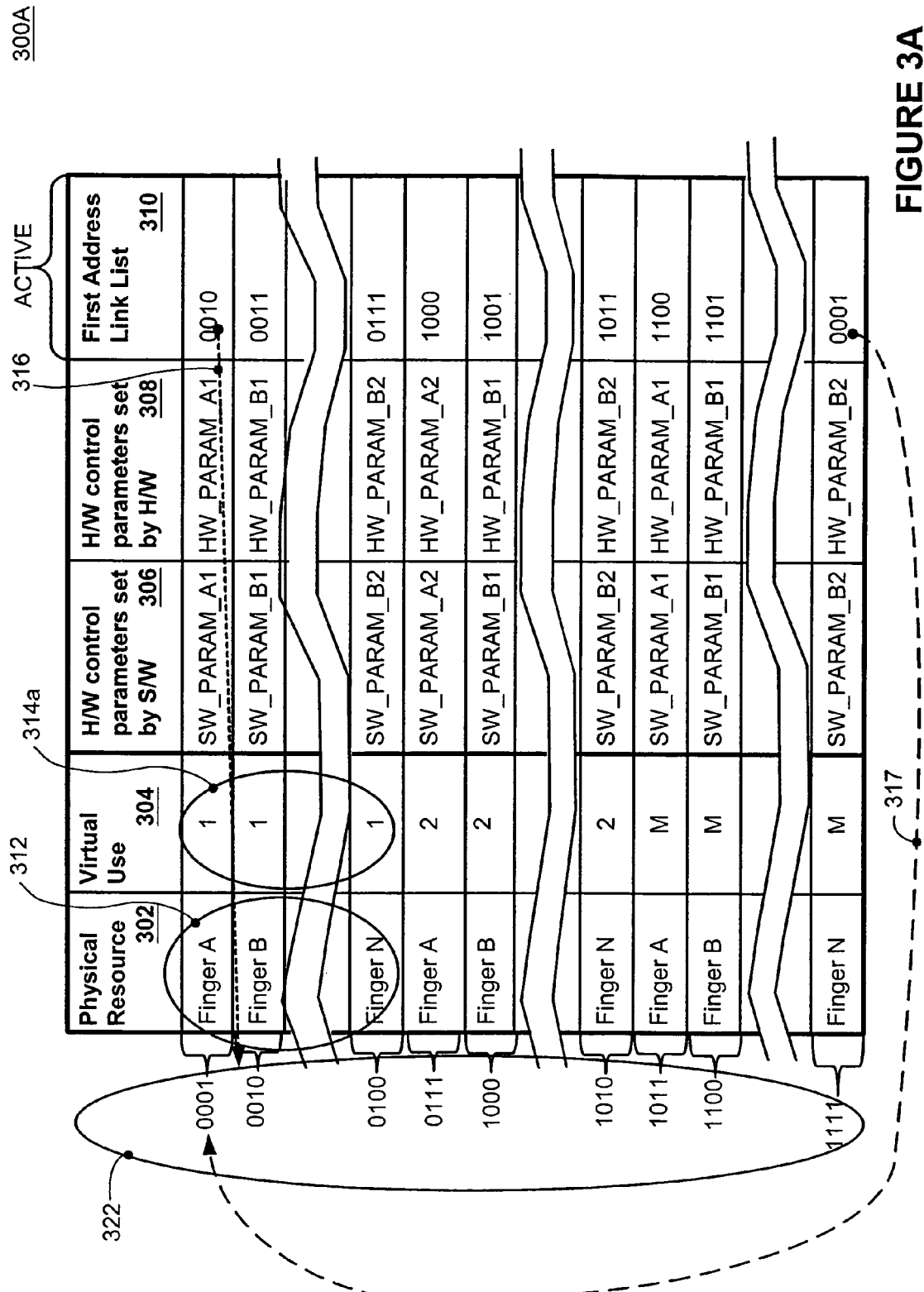
FIG. 3A is a table of computer memory fields that store code for software-based allocation and scheduling of hardware resources, in accordance with one embodiment of the present invention.

Referring now to FIG. 3A, a table of computer memory fields that store code for software-based allocation and scheduling of hardware resources, in accordance with one embodiment of the present invention. Table 300A provides an exemplary embodiment of information stored in memory, e.g., memory 152 of FIG. 1B, to provide software-based allocation and scheduling of hardware resources.

Some columns in table 300A are descriptions of what memory storage represents, such as physical resource column 302, virtual use column 304.

Physical resource column 302 refers to the physical resources desired, e.g., a finger element, as determined by function block 230 of FIG. 2C. Virtual use column 304 refers to the time slot of a given system cycle which is using the hardware resource. Thus, for example, virtual use 1 314a represents one use of physical resource set 312 of Finger A, Finger B, through Finger N. FIG. 1C shows the virtual use 1 166 in a time domain of a single hardware element A, e.g., a finger element 156a, that is shown in the physical domain in FIG. 1B. Addresses 322 lists of the addresses of a given row. Thus, the first row has a memory address of '0001'.

Other columns in table 300A represent the information, or class of information, that is actually stored in the memory buffers, e.g., memory 152 of FIG. 1B. For example, column 306 entitled hardware (H/W) control parameters set by software (S/W) represents a category of information stored in table 300A. In one embodiment, contents of column 306 are provided by a user via inputs 232a–232c in function block 230 of FIG. 2C in conjunction with computer 202 in FIG. 2B, in one embodiment. Parameters in column 306 can include hardware resource configurations required to conform to one of multiple possible communication (e.g., 3GPP) or data processing (e.g., IEEE 802.11b) protocols. Parameters in column 306 can also be user-defined performances, such as thresholds or state changes, as well as user-defined proprietary algorithmic settings for hardware within a given communication protocol. A user can be defined as a system operator, an infrastructure provider, or any other entity associated with the operation of a device using the flexible scheduler. In one embodiment, the possible settings for the function blocks are defined in Appendix A of the CBE, incorporated by reference hereinabove.

Another class of information is the H/W control parameters set by hardware 308. Column 308 includes data from internal components of communication device 100a such as from parameter estimators 112 as shown in FIG. 1A, in the present embodiment. In this embodiment, parameter estimator 112 will provide data, stored in column 308 for a given channel, e.g., data from channel estimator, the frequency lock loop, the phase lock loop, and other devices/functions that promote proper processing of the data signal. States of devices used in virtual uses will also be stored in this column. For example, code generator unit (CTU) states that will ensure the continuation of a code sequence at an appropriate point is stored such that virtual uses may continue the sequence seamlessly. Lastly, the first address link list column 310 stores addresses for the next executable row of data for any given row of data, thereby allowing sequential steps or jump steps to information allocating and scheduling of the hardware resources. The arrows and function of the first address list is explained more fully in flowchart figures described hereinafter.

Each row represents a unique combination of both a hardware resource and a virtual use. Thus, equation [1] referred to above, indicates the number of rows necessary, e.g., M×N rows. Each row has data entries listed for each the columns described hereinabove. The entire table 300A is traversed according to the link list sequence within a given system cycle, e.g., cycle 162 of FIG. 1C, in the present embodiment.

The allocation and scheduling information for a given hardware resource located within a row of data from table 300A can be referred to as a 'word' of information. Hardware resources, e.g., 102b of FIG. 1B, can implement data from a word of data transmitted by Table 300A by selectively reading the predetermined portions of the word of information at the appropriate component of hardware, in the present embodiment. Output from the table can be a 32-bit word, with 16 bits from column 306 and 16 bits from column 308. The first 16-bit portion from column 306 can be selectively extracted from the word of data and supplied to the appropriate controllable portion of the hardware resource using a mask circuit or other similar means.

While the present embodiment provides specific columns for parameters set by both hardware and software, the present invention is well suited to having any columnar format with any kind of parameters stored in software that will accommodate the needs of the hardware resources for a given electronic device in a given application. Furthermore, while the present embodiment shows virtual uses of physical hardware resources, the present invention is well suited to implementing table 300A for just physical hardware resources. The quantity of bits of data stored and provided by table 300A can be any value, as determined by a user and implemented in memory.

By using software, e.g., a table of rearrangeable data in memory, to control hardware resources the amount of control and flexibility available to a user increases significantly. Furthermore, the control parameters and information themselves can quickly and easily be changed by inputs from either a user or other hardware components. Thus, rather than building a new controller for a different sequence, a quick and efficient software change can accommodate the new control sequence and parameters for hardware resources. This paradigm saves cost, design time, infrastructure, and other resources while improving customer support, lengthening lifespan of a device, and enabling new technologies to be implemented in a given device.

Figure 3B:
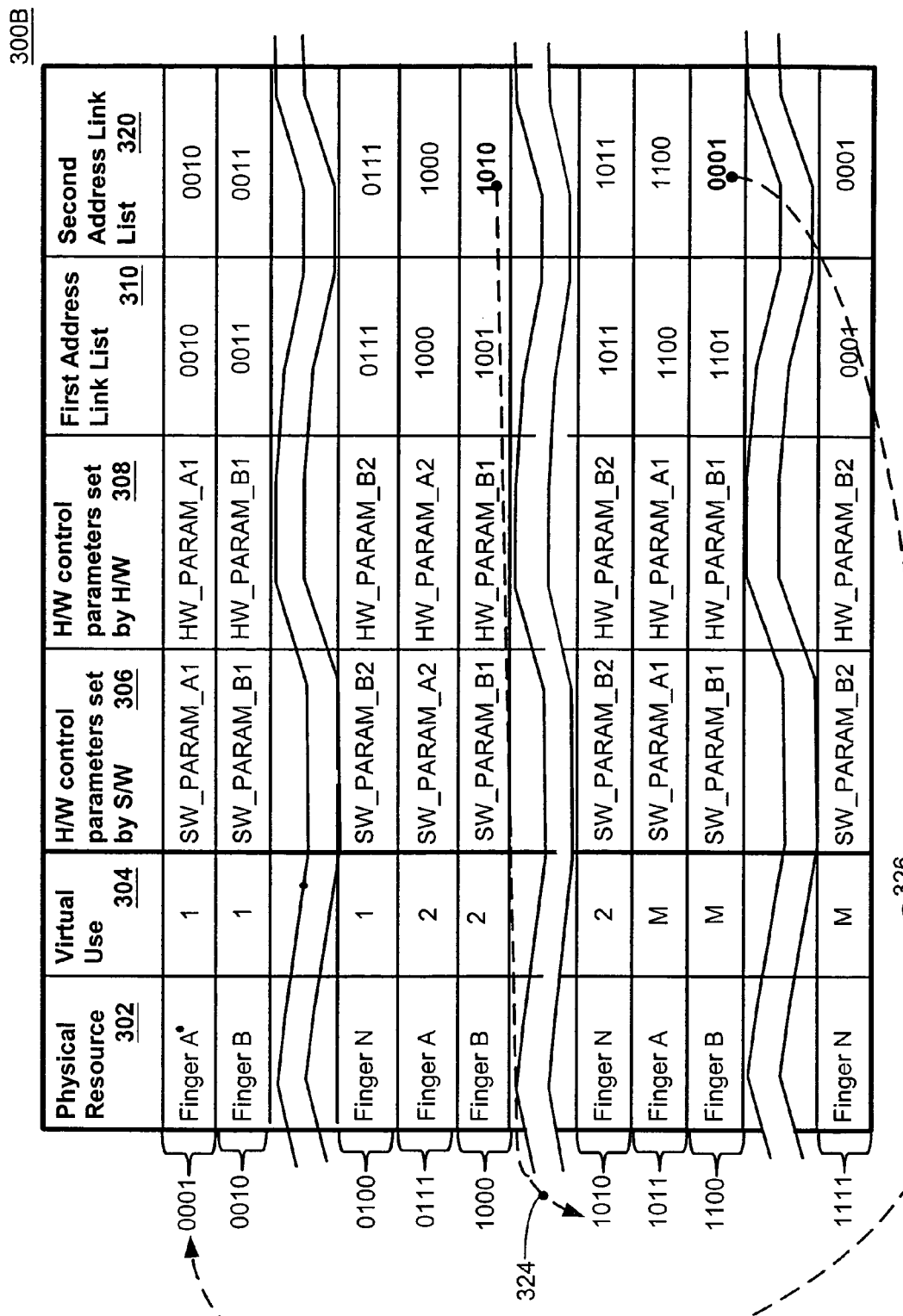
FIG. 3B is a table of computer memory fields that allow dynamic changes in the software-based allocation and scheduling of hardware resources, in accordance with one embodiment of the present invention.

Referring now to FIG. 3B, a table of computer memory fields that allow dynamic changes in the software-based allocation and scheduling of hardware resources is shown, in accordance with one embodiment of the present invention. Table 300B of FIG. 3B is similar to Table 300A of FIG. 3A, with the addition of a column entitled second address link list 320. By having multiple columns of linking address lists, changes to the controller can be dynamically implemented, e.g., without interrupting the real time operation of the electronic device being controlled, while maintaining integrity and robustness of the electronic device. Thus, a device having a dynamic controller with memory similar to Table 300B can be very responsive and efficient to changing environments and system loads. In this manner, user performance is enhanced while resources are conserved. Any number of address link lists can be generated, thereby providing multiple possible control processes from which a higher-level controller or processor may choose.

Figure 3C:
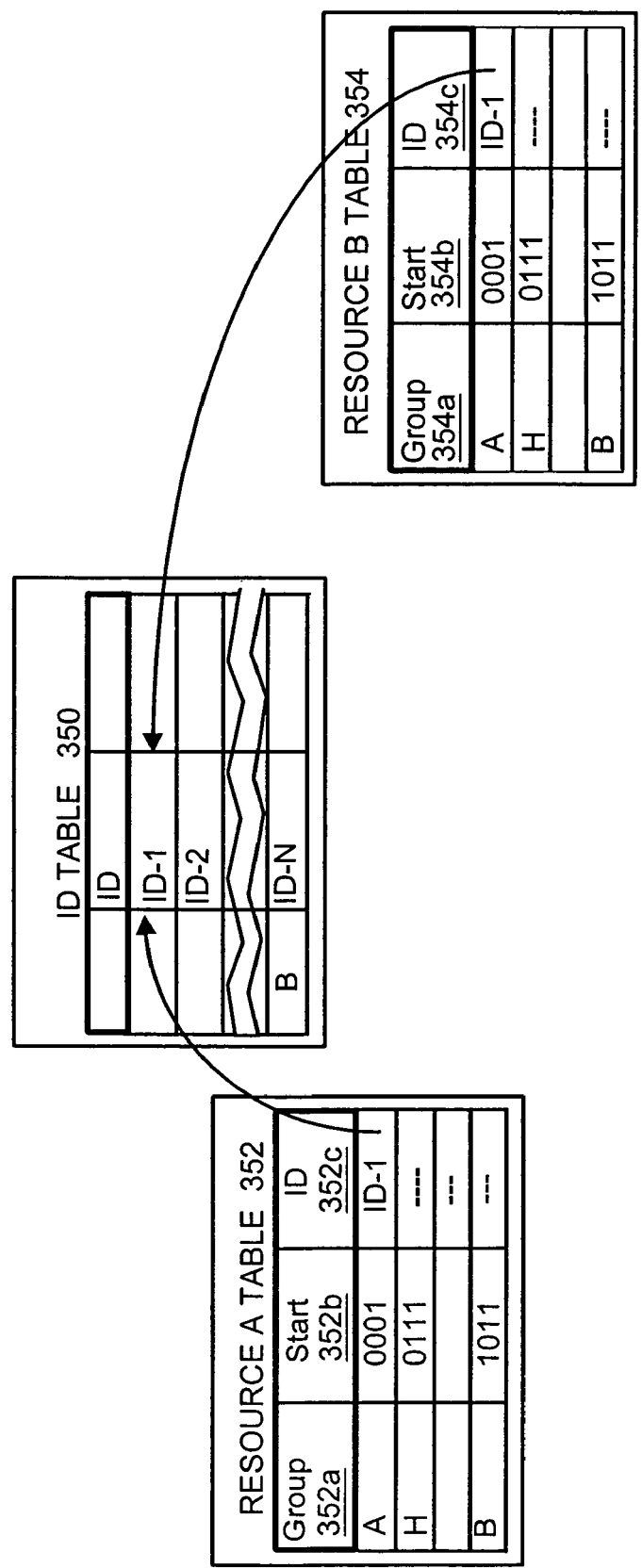
FIG. 3C is a table of computer memory fields that provide a hierarchy of software-based allocation and scheduling of hardware resources, in accordance with one embodiment of the present invention.

Referring now to FIG. 3C, a table of computer memory fields that provide a hierarchy of software-based allocation and scheduling of hardware resources is shown, in accordance with one embodiment of the present invention. FIG. 3C includes an ID table 350, a resource A table 352 and a resource B table 354. ID table 350 includes a column for ID in which entries for ID-1, ID-2, and ID-N are shown. Resources tables 352 and 354 have a link in column 383 that point to the ID table. When a new user, e.g., mobile, first requests use of hardware resources in communication device 100a, their IDS can be entered into table 350 to allow tracking of the user for multiple processes and hardware resource allocations throughout the communication device. Pointers in the resource tables 352 and 354 provide a backtracking reference of determining the user.

Figure 3D:
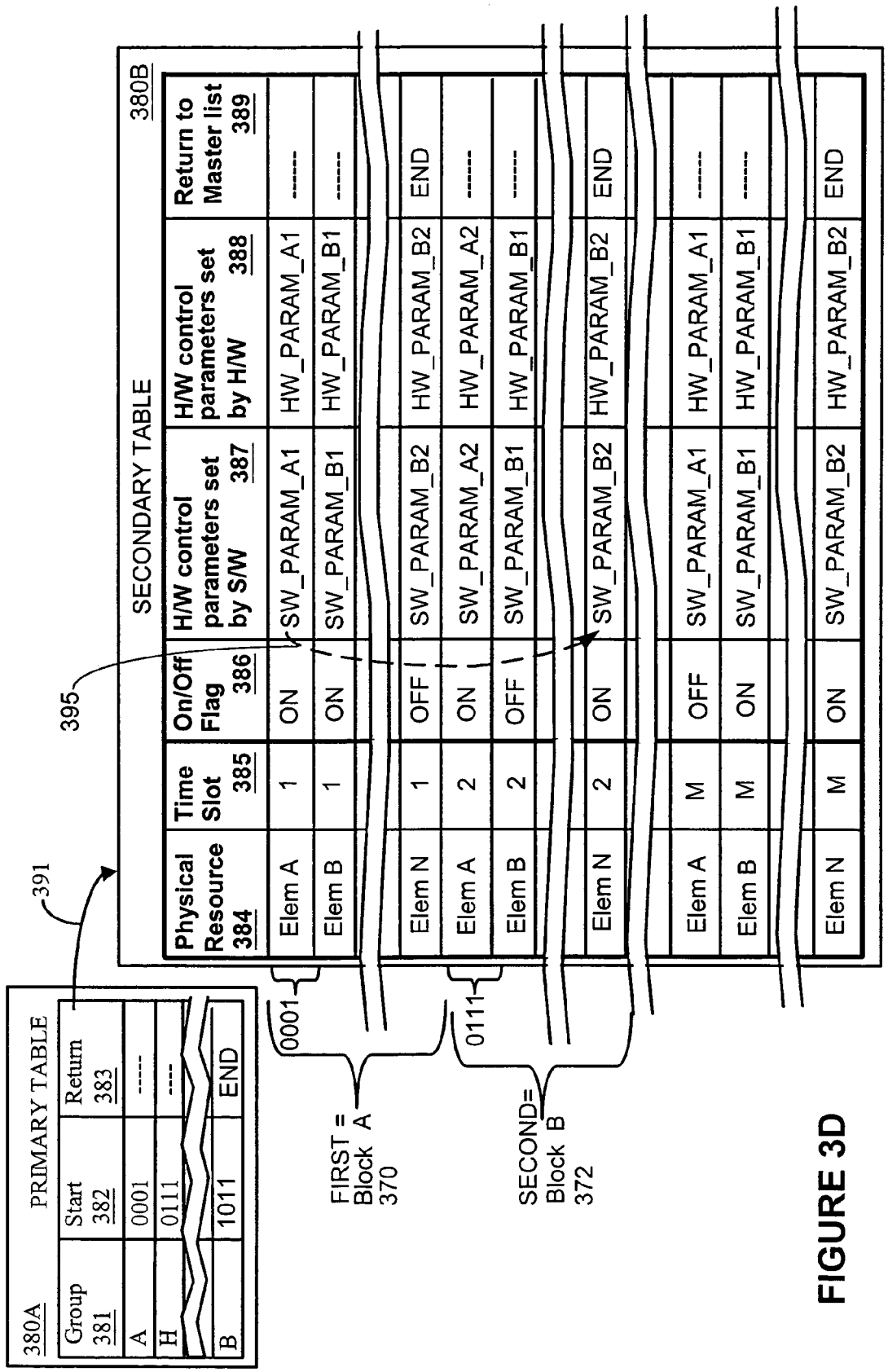
FIG. 3D is a table of computer memory fields that track users of software-based allocation and scheduling of hardware resources, in accordance with one embodiment of the present invention.

Referring now to FIG. 3D is a table of computer memory fields that track users of software-based allocation and scheduling of hardware resources, in accordance with one embodiment of the present invention. Primary table 380A lists groups of hardware resources by a group identification in column 381 and by a pointer to a secondary table that identifies the start location for the control information on the hardware resources slated for the group. Primary table can provide a reference back to an ID table, e.g., table 350. The last entry in primary table is for B, after which the first line in primary table is resume, e.g., pointer end traverses to the first line of the table. Secondary table includes an on/off column to turn control parameters for a hardware resource either on or off. No link list is listed in column 389 for all the entries in a group, e.g., first block A 370. This is because each entry has a default pointer to the next line in the table. In this manner, total flexibility throughout the table is eliminated at the benefit of ease of implementation and speed through which the table may be traversed. However, a link address can be implemented for any line of a hardware resource. This list can be referred to as a chunk list in that all the hardware elements in first block A 370 are implemented in a sequential fashion as the default address link sequence. While the present embodiment provides a specific quantity of table and columns in each table, the present invention is well suited to utilizing more or less columns with different types of information for other purposes. The flexibility and implementation ease of the present invention is still maintained with these alternative embodiments. Additional information on the design and implementation of primary and secondary tables 308A and 380B respectively, is provided in co-pending U.S. patent application Ser. No. 60/222,853 entitled "Dynamically Reconfigurable Universal Transmitter System" by Medlock et al., filed Aug. 3, 2000. This related application is commonly assigned, and is hereby incorporated by reference.

Processes

Figure 4A:
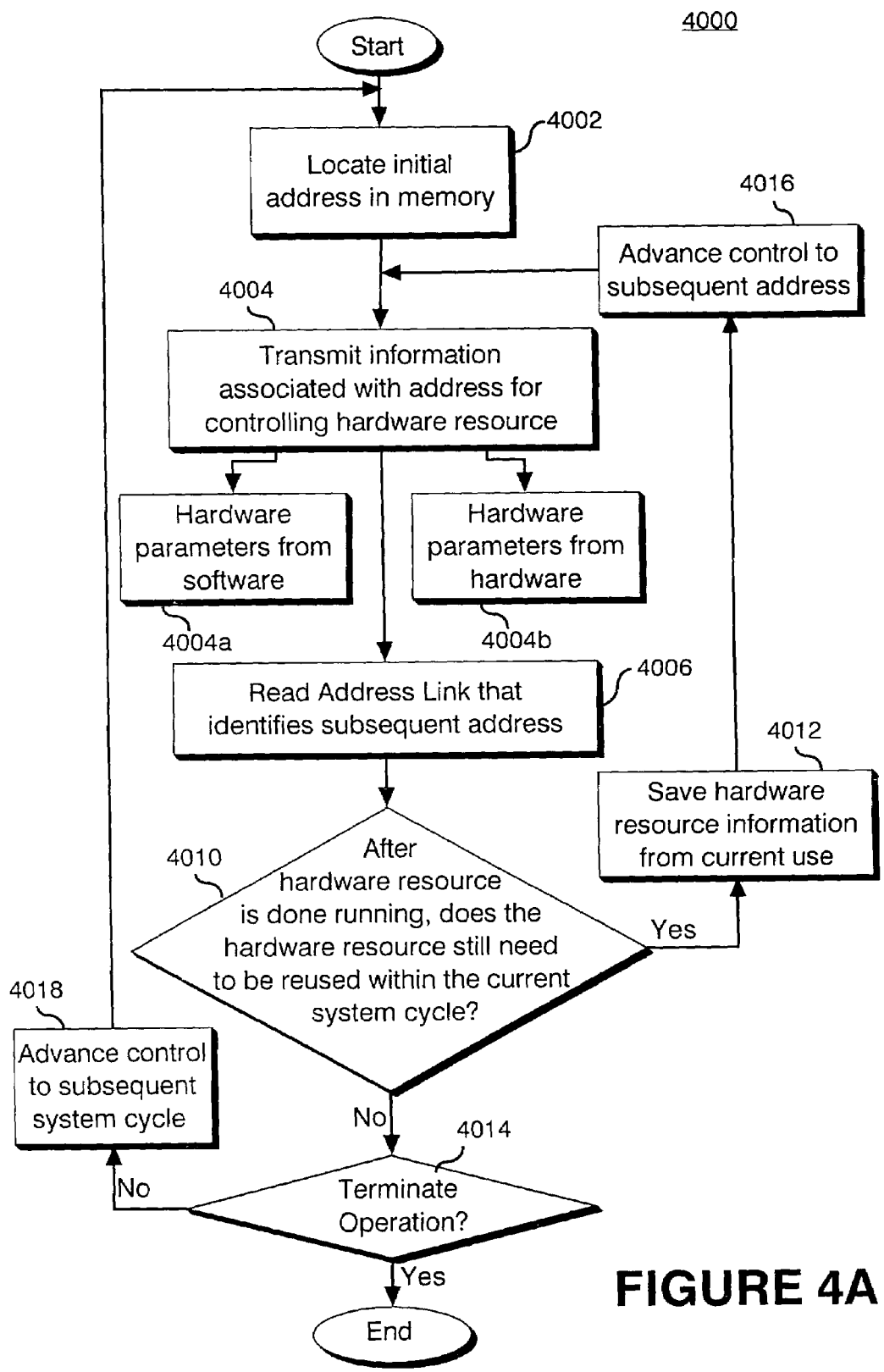
FIG. 4A is a flowchart of a process that operates a software-based allocator/scheduler of hardware resources in an electronic device, in accordance with one embodiment of the present invention.
Figure 4B:
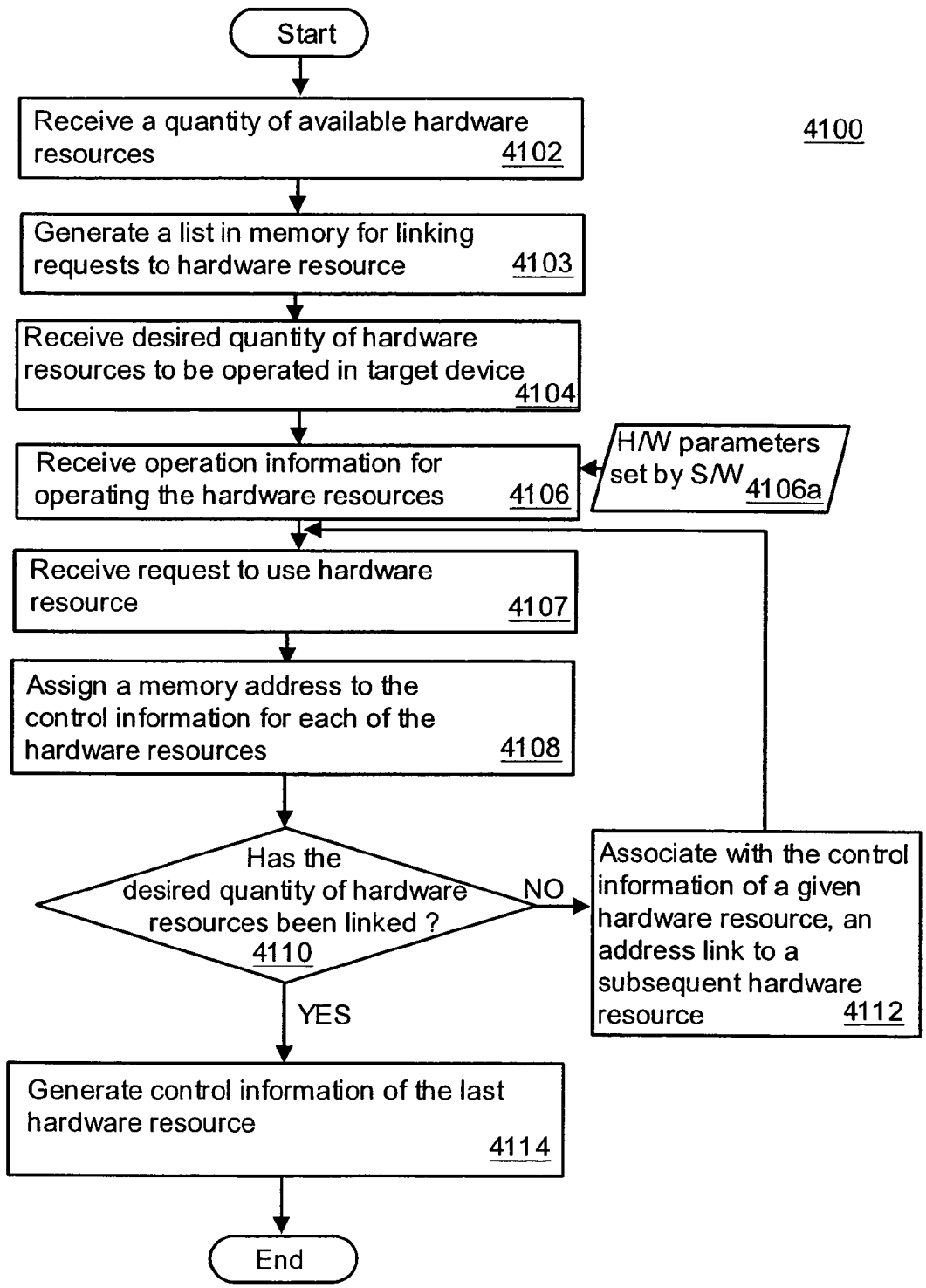
FIG. 4B is a flowchart of a process that generating a software-based allocator/scheduler of hardware resources in a communication device, in accordance with one embodiment of the present invention.
Figure 4C:
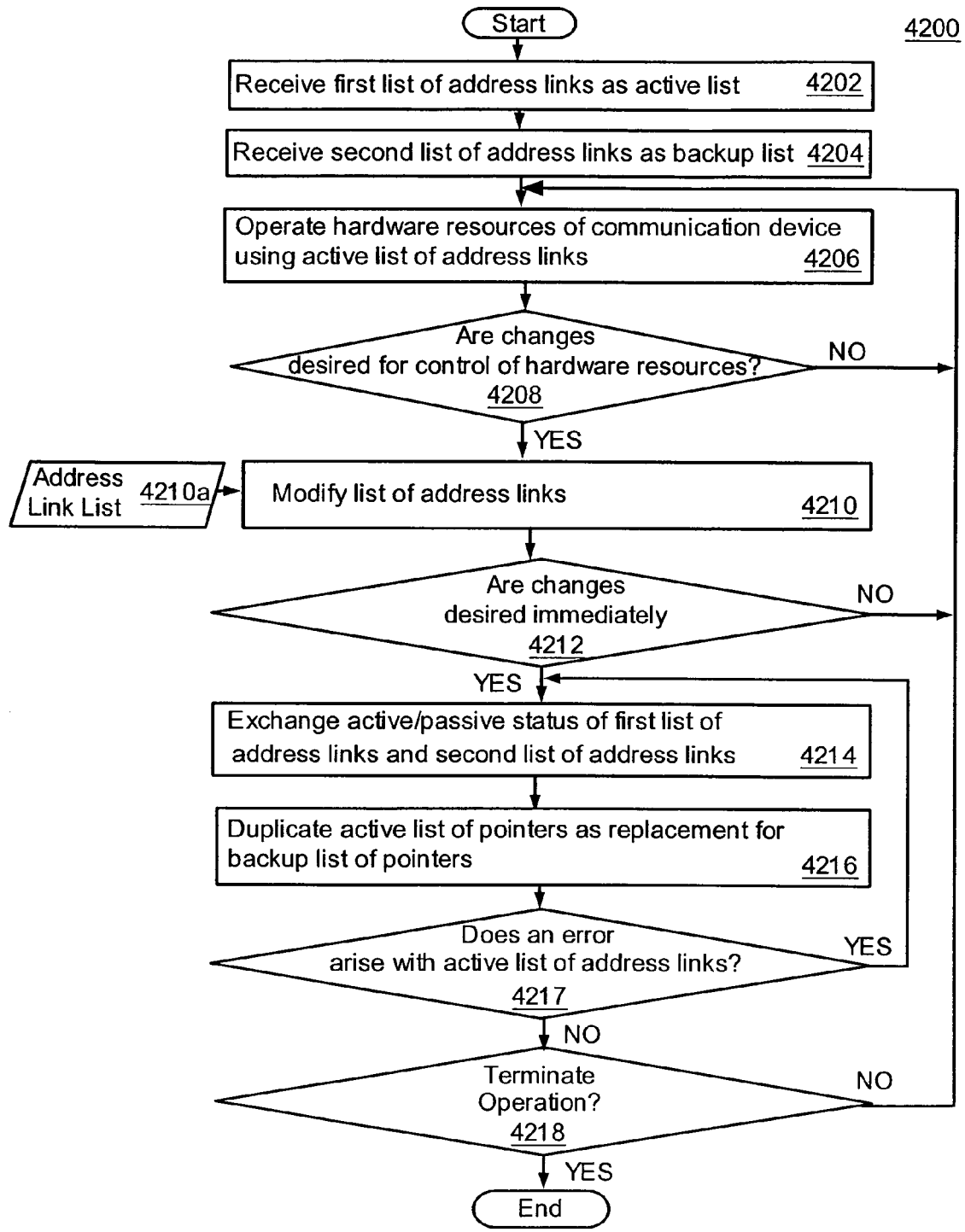
FIG. 4C is a flowchart of a process for dynamically changing the software-based allocator/scheduler of hardware resources in an electronic device, in accordance with one embodiment of the present invention.

FIGS. 4A through 4C are flowcharts of processes that can be implemented on exemplary functions and/or hardware of FIGS. 1A through 3B. Referring now to FIG. 4A, a flowchart of a process that operates a software-based allocator/scheduler of hardware resources in an electronic device is shown, in accordance with one embodiment of the present invention. By using flowchart 4000, the present invention allows hardware resources in an electronic device to be flexibly controlled, thereby allowing a system to be tailored to a wide range of changing variables.

Flowchart 4000 begins with step 4002. In step 4002 of the present embodiment, the initial address is located in memory. Step 4002 is implemented by a higher-level controller/microprocessor locating the first line of the controller instruction. In one embodiment, controller 130 of communication device 100*a* in FIG. 1A locates the first line of controller memory, with address '0001' represented literally in address column 302 for controlling hardware resources 102*b* of receiver processor 102. Step 4002 can be implemented by local controller 154 of FIG. 1B in another embodiment. Step 4002 can also be implemented by another table in memory 152 providing a pointer, such as that shown in FIG. 3C by primary table 380A for Group A pointer to location of '0001' in secondary table 380B. Following step 4002, flowchart 4000 proceeds to step 4004.

In step 4004 of the present embodiment, the information associated with address for controlling a hardware resource is transmitted. Information includes hardware (H/W) parameters from software (S/W) output 4004*a* and H/W parameters from H/W output 4004*b* in the present embodiment, as defined for column 306 and 308 respectively in FIG. 3A. However, step 4004 can include fewer or greater parameters as well as different types of parameters in another embodiment. Tracking scheduler 102*a* is hard coded to the finger elements 156*a* through 156*n* of FIG. 1B, with appropriate interface to accommodate the virtual use context switching over time. Step 4004 can include a setup stage to provide parameters and state information to the hardware resource for the given user profile accessing the hardware resource, e.g., the virtual resource for this particular use. By using a setup stage, processing for one virtual use, e.g., virtual use 1 166, can occur while a subsequent virtual use is being setup in memory local to the hardware for another virtual use, e.g., virtual use 2 168, as shown in FIG. 1C. Following step 4004, flowchart 4000 proceeds to step 4006.

Flowchart 4000, and tracking scheduler 102*a*, does not utilize a conventional handshake protocol in the present embodiment to confirm completion of a given process, e.g., process 166*b*, for a given virtual use, e.g., virtual use 1 166, as shown in FIG. 1C. Rather, by limiting the virtual use to a predetermined length of time, the scheduler assumes that a given virtual use is completed after the elapse of the predetermined time. In the present invention, the processing stage, e.g., 166*b* of FIG. 1C, is limited apriori to a specific quantity or duration of processing to ensure completion of all processing cycles of all virtual uses within system cycle 162. However, the present invention is well suited to using a handshaking protocol to confirm completion of a processing stage.

In step 4006 of the present embodiment, an address link is read from the row currently being implemented. The address link indicates the location of the next row whose information is to be read and transmitted. For example, if the first row, e.g., row address '0001' is being read from Table 300A in FIG. 3A, then the linking address of '0010' is read from the first link address link list 310. The linking address happens to be the next sequential row in memory in the present embodiment, and thus an effective path 316 is followed in table 300A. In contrast, Table 300B of FIG. 3B shows an embodiment where row address '1000' has a second address link of '0001' in column 320 which effectively skips the rows with addresses between '1000' and '1010' as illustrated by path 324. This situation may have arisen because a user had a poor performance of a multipath signal, and thus fewer fingers are necessary to process data from that user. A similar bypass occurs as shown by path 326.

In another embodiment implementing step 4006, the linking address for an entry automatically moves as the next row within a group. For example, first block A 370 in FIG. 3D includes all physical resources of Element A through Element B in column 384 for a Virtual Use, or time slot, of '1' in column 385. Each physical resource has a link address to the next element in this group. A different link may be established for any entry in the group to override the default link to the next element. This latter embedment reduces overhead in that the link is predetermined. Following step 4006, flowchart 4000 proceeds to step 4010.

In step 4010 of the present embodiment, an inquiry determines whether after ther hardware resource is doen running, the hardware resource still needs to be reused within the current system cycle. If a given hardware resource is reused within a system cycle, then flowchart 4000 proceeds to step 4012. Alternatively, if the given hardware resource is not reused within the system cycle, then flowchart 4000 proceeds to step 4014.

In step 4012 of the present embodiment, the hardware resource information from the current use is saved. The hardware resource information can include states and timing information of the process being executed that are required to continue the process in the next cycle for the given user, e.g., mobile. The save stage saves appropriate parameters and states of the hardware resource following the processing stage. The setup and save stages of a use of a given hardware resource are performed in parallel with a process. Step 4012 is implemented in one embodiment by save stage 166*c* for virtual use 1 which is occurring at the same time that setup stage for virtual use 2 is loading data into finger A 156A in FIG. 1B from memory 152, for hardware resource to utilize. The setup and save can use local cache (not shown) in element, e.g., finger A 156A in one embodiment. Alternatively, any type of series or parallel processing is possible, given the appropriate memory and communication lines. The state and timing information can be saved in column 306 of table 300B.

In step 4016 of the present embodiment, control is advanced to the subsequent address. In the present embodiment, the link address can move control anywhere in the table as shown in FIG. 3A. In another embodiment, the link address simply moves to the next executable line in the table that has been predetermined. This latter embodiment can provide a change in the link address at either all entries or only at certain break points, e.g., at the end of a group of elements such as group block A 370 of FIG. 3D. Following step 4016, flowchart 4000 returns to step 4004.

In step 4014 of the present embodiment, an inquiry determines whether the operation should be terminated. If the operation should be terminated, then flowchart 4000 ends. If, on the other hand, the operation should not be terminated, then flowchart 4000 proceeds to step 4018. Step 4014 provides logic for flowchart 4000 to repeatedly execute lines of control information for subsequent virtual uses of hardware resources. Step 4014 also provides the logic for flowchart 4000 to cease the execution of lines and return control to some external entity, e.g., host controller or a higher-level scheduler table such as primary table 380A. Table 300A provides an pointer at the end of the table entries, and it points back to an appropriate starting location, as shown by path 317.

In step 4018, control is advanced to a subsequent system cycle. Step 4018 is implemented by local controller 154 reading an end pointer and returning to some higher level table, e.g., primary table 380A, or higher level controller, e.g., host controller 130. Only the last element desired to be implemented the link address of 'end' or 'null' in column 389 that returns it to the primary table 380A. The end pointer can exist at the end of a group of elements, e.g., block A 370, or can exist only at the end of a list of all elements. By using a pointer, the present system does not need interrupt signals because control is passed with known steps. This process also makes changes in the sequence and allocation of elements easier to implement because he changes can be made at the predetermined times and implemented at known cycles of the control handoff.

Referring now to FIG. 4B, a flowchart of a process that generates a software-based allocator/scheduler of hardware resources for a communication device is shown, in accordance with one embodiment of the present invention. Flowchart 4100 can implemented using computer system 202 to implement some of the software-based allocator/scheduler configurations to be implemented in a communication device. Other steps of flowchart 4100 can be executed on the actual communication device itself, e.g., device 100a of FIG. 1A. This allows a user to remotely design a software-based allocation and scheduling system for hardware resources in a communication device as described in FIGS. 1A and 1B.

Flowchart 4100 begins with step 4102 wherein a quantity of available hardware resources is received. Quantity of available hardware resources is described for input 232a in FIG. 2C. In one embodiment, only physical hardware resources are considered in step 4102 while another embodiment additionally considers virtual uses of the physical hardware resources. Following step 4102, flowchart 4100 proceeds to step 4103.

In step 4103, a list is generated in memory for linking requests to a hardware resource. Step 4103 is implemented in one embodiment by generating one or more lists in memory 152 of tracking scheduler 102a in communication device. In one embodiment, a list such as table 300A is generated listing all the virtual resources available for the given function, e.g., fingers. In another embodiment, a table such as primary table 380A is created to track the group allocation or identity, e.g., group column 381, while a secondary table is also generated that maps out either the entire virtual use space or a predetermined blocking of virtual uses. For example, ID table 350 of FIG. 3C can be set up to list identification information and tie processes, e.g., searcher processor functions and receiver processor functions, through communication device 100a to a given user or mobile via table 350. Subsequent secondary table 380B can map out 3 fingers as a default group size of hardware resources provided to a group, e.g., a mobile, for either the entire quantity of hardware resources, e.g., virtual uses included, or a fraction thereof with a reserve quantity available for dynamic changes.

In step 4104, a desired quantity of hardware resources to be operated in target device is received. The desired quantity of hardware resources can account for virtual uses beyond the quantity of the physical hardware resources themselves. The desired quantity of hardware resources is provided as input 232c to the controller configuring function 230 of FIG. 2C. The desired quantity of hardware resources is limited in the present embodiment to the maximum number of the total virtual uses of the physical hardware resources. The desired quantity of hardware resources is also provided in communication device 100a when the software-based allocator/scheduler is implemented. Typically the desired quantity of hardware resources changes during operation of communication device 100a, and thus is a dynamic process. Following step 4104, flowchart 4100 proceeds to step 4106.

In step 4106 of the present embodiment, operation information for operating each of the hardware resources is received. Operation information, which can include control information, that is received includes semi-static hardware parameters 4106a input, e.g., hardware control parameters set by software of Table 3A. Operation information is described as parameters set for column 306 of FIG. 3A in one embodiment. That is, input 4104 is provided in column 306 of Table 300 in FIG. 3A and as input 232b in FIG. 2C. In the present embodiment, all the control parameters for a given function are the same. However in another embodiment, the control parameters can be different for different channels, e.g., tailored depending on type of user, application, etc. within the communication device. This operation information is generated in one embodiment by FIGS. 2B and 2C and stored as controller information 203 in external processor device 202, and communicated via medium 209 to communication device 100a as shown in FIG. 2A. A user can provide this operation information input per proprietary or well-known algorithmic solutions to a given data processing application, including but not limited to wireless communication. Operation information generated externally can be received in terms of parameter settings 144 at communication device 100a. Following step 4106, flowchart 4100 proceeds to step 4107.

In step 4107 of the present embodiment, a request is received to use hardware resources. Step 4107 is implemented in the present embodiment by communication device 100a of FIG. 1A receiving a request from host processor 130 or from tracking scheduler 102a, e.g., via a primary table 380A that has now read a pointer to enable secondary table execution of hardware resources. If a new mobile device is trying to communication with communication device 100a for the first time, its ID can be entered on ID table 350 of FIG. 3C, with subsequent assignment of fingers from secondary table 380B. Resource table B 354 can be a separate table that allocates the fixed number of hardware resources. A pointer from the resource table 354 points to the ID table to indicate the identification of the user for the applicable hardware resources. Following step 4107, flowchart 4100 proceeds to step 4108.

In step 4108, a pointer is generated for operation information of a hardware resource. Step 4108 can be implemented by primary table 380A of FIG. 3D that generates a start pointer in column 382 for a new group or user ID that desires to use the resources controlled by secondary table. Alternatively, the hardware resource information can be added into an existing group with open or unused virtual resources. For example, unused element N for virtual use 1 has an 'off' flag in column 386 and thus may be implemented for a new request that needs only one hardware resource. The hardware resource is one virtual use of a physical hardware. Following step 4108, flowchart 4100 proceeds to step 4110.

In step 4110, an inquiry determines if the desired quantity of virtual hardware resources have been linked. If the desired quantity of virtual hardware resources has been linked, then flowchart 4100 proceeds to step 4114. However, if the desired quantity of virtual hardware resources has not been linked, then flowchart 4100 proceeds to step 4112. Step 4110 ensures that the desired quantity of virtual hardware resources exist and have been linked to provide an initial link list that has continuity, e.g., no hardware resources have been skipped unintentionally. In one case, only a fraction of the hardware resources are made available for an initial assignment for requests, with a reserve quantity available for dynamic changes. In the present embodiment, only physical hardware resources are used at first, and only after they are all consumed, will virtual uses be instantiated.

For example, if two physical resources existed that could be utilized in two virtual uses, and then four virtual resources are available. If a mobile only wanted two virtual uses, then either both hardware resources could be used with no virtual reuse or a single hardware resource could be used with two virtual uses. The present invention is well suited to any combination or use of the hardware and virtual uses to satisfy a desired need.

Step 4112 arises if the desired quantity of virtual resources has not been linked per step 4110. In step 4112, an address link to control information for a subsequent hardware resource is associated with the control information for given hardware resource. Following step 4112, flowchart 4100 returns to step 4107.

In step 4114 of the present embodiment, control information is generated for the last hardware. Step 4114 can generate end or null statements at the end of each group of hardware as shown in Table 380B column 389 that points back to a primary table. Alternatively, the last hardware resource may simply point back to the beginning of a list, as shown in FIG. 3A, without the use of a primary table. Following step 4114, flowchart 4100 ends.

Referring now to FIG. 4C, a flowchart of a process for dynamically changing the software-based allocator/scheduler of hardware resources in an electronic device is shown, in accordance with one embodiment of the present invention. Flowchart 4200 is implemented in the present embodiment using communication device 100a of FIG. 1A. By using flowchart 4200, flexible scheduler in communication device 100a can be dynamically changed, e.g., without interrupting the real time operation of the electronic device being controlled, without any detectable change in performance for existing processes. Furthermore, the dynamic changes can be implemented while still providing robust and reliable operation.

Flowchart 4200 begins with step 4202, wherein a first address link list is received in the present embodiment. Step 4202 is implemented by receiving a first address link list via medium 209 described in FIG. 2A, and stored in memory in first address list column 310 as shown in FIG. 3B. First address link list is described as outputs from FIG. 2B, and is received as address link input 142 and parameter input 144 shown in FIG. 1A. The first list of pointers is chosen as the default active list in the present embodiment. Following step 4202, flowchart 4200 proceeds to step 4204.

In step 4204 of the present embodiment, a second address link list is provided as a backup to the first address link list. Second address link list can be internally generated as a simple copy of the first list of address links in the present embodiment. Alternatively, an entirely separate and independent second address link list can be received by communication device in a manner described in step 4202. Step 4204 is implemented similarly to step 4202, but stored as second link address list 320 as shown in FIG. 3B. Second address link list is backup to complement the first address link list. Step 4204 is applicable for software-based allocator/scheduler of FIG. 3B. However, it is not required for secondary table 380B of FIG. 3D. Following step 4204, flowchart 4200 proceeds to step 4206.

In step 4206 of the present embodiment, the hardware resources of the electronic device, e.g., the communication device, are operated using the active list of pointers. Step 4206 is implemented in the present embodiment using the process described in flowchart 4000 of FIG. 4A. Selection of which address list is active is controlled by a higher-level controller or processor, such as the host processor 130 of communication device 100a of FIG. 1A. Any combination of tables in FIG. 3A through 3D can be utilized for performing the allocating and scheduling functions for the hardware resources. Following step 4206, flowchart proceeds to step 4208.

In step 4208 of the present invention, an inquiry determines whether changes are desired for control of the hardware resources. If changes are desired to the control of the hardware resources, then flowchart 4200 proceeds to step 4210. However, if changes are not desired to the control of the hardware resources, then flowchart 4200 returns to step 4206. A change can arise due to the movement of a mobile device into another sector of a communication device, e.g., base station, receiving its signals. Alternatively, a change can arise due to hardware resource changes in the communication device. Step 4208 is implemented by a higher-level controller, e.g., host controller 130, receiving information that requires a change.

In step 4210 of the present embodiment, the address links for the hardware resources are modified per the desired change. In one embodiment, linking addresses such as those in first address link list 310 of FIG. 3B can be modified. Alternatively, an on/off flag can be toggled in column 386 of FIG. 3D for a chunk list operation. Thus, step 4210 is implemented in the present embodiment, by making changes to the second address link list to either bypass over hardware resources or virtual uses thereof, or alternatively to relink hardware resources or virtual uses that were previously bypassed. Changes for hardware resources can also be accomplished in primary table 380A of FIG. 3D. In this case, if a group does not need hardware resources, it can be removed from the primary table list.

Inputs to step 4210 include new link list address 4210a. New link list address provides either an entire link list or a change to an individual address link. Either link list can be the backup list rather than the active list. The backup list is the list that is changed because it is not being used for actively controlling the hardware resources. Thus, prior to implementing changes control logic identifies the passive list of address links. This paradigm allows changes to be implemented by the present invention in real time, while the electronic device and hardware resources are currently being controlled by the active address link list. FIG. 3B illustrates how the row with address '1000' for Finger B virtual use 2 has a linking address of '1001' for first link address list 310. However, this same row has received a change for the second link address list 320 from some previous linking address to a new linking address of '1010.' Consequently, path 324 is followed when executing table 300B, thereby bypassing last rows with addresses between row address '1000' and '1010'. This change could have occurred for any one of a number of reasons ranging from quality of service to poor reception, all under the potential high-level management of user-defined criteria. For example, a poor multipath performance may have necessitated the dropping of a finger resource for the given user. Alternatively, hardware resources currently bypassed in Table 300B may now be reintroduced into the sequencing of the address link list to accommodate a new channel that will now utilize fingers of FIG. 1B that were previously idle, e.g., hardware resources between row address '1000' and '1010'.

In step 4212 of the present embodiment, an inquiry determines whether changes are desired immediately. Step 4212 is implemented by use of a status flag or a check bit that is evaluated by local controller 154 of FIG. 1B, but may also be implemented by a hierarchical controller, e.g., the host controller 130 of FIG. 1A. Step 4212 allows for either accumulating non-critical changes to the address link list over time or for implementing an urgent change in the link list immediately. In this manner, the controller can be as responsive as the user desires. Accumulating non-urgent changes has the effect of conserving power and avoiding excessive switchovers between link lists. In another embodiment, change requests are implemented by default at the next non-operating period of a given list, e.g., primary table 380A. If a change is desired to be implemented immediately, the flowchart 4200 proceeds to step 4214. However, if a change is not desired to be implemented immediately, then flowchart 4200 returns to step 4206.

Step 4214 of the present invention arises if the changes desired for the controller are implemented immediately. In step 4214 of the present invention, the active and passive status of the first address link list and the second address link list is exchanged. Step 4214 is implemented similarly to step 4212 where a higher-level controller 130 of FIG. 1A, or the local controller 154 of FIG. 1B, indicates the controller which address list is the active list. The implementation of the change from one address list to another address list occurs at the initial row of the table in the present embodiment. Thus, for example, the active address link list won't change midway down table 300B. However, the present invention is well suited to any type of changeover procedure from one list to another. For example, one list can be an active list used to actively control the hardware resources while the second list can be a passive list, accepting changes to the link list. Either address list can be active, with the other one being passive. For example, if row '0111' for Finger A at virtual use 2 is to be changed from a link address of '1000' to '0001' in second address link list 320 and is desired to be implemented immediately, then once first link address list 310 reaches the last row, e.g., row '1111' and is linked to the first row '0001', the higher level controller has implemented a flag to make the second link address list 320 be the active list. Following step 4214, flowchart 4200 proceeds to step 4216.

Step 4216 of the present invention duplicates the active address link list into the passive address link list. Step 4216 is implemented as soon as the exchange of the active/passive status of first link address list 310 and second link address list 320 has been completed, in the present embodiment. Alternatively, the duplication of one list of address links can be performed immediately prior to a subsequent exchange step 4214. Following step 4216, flowchart 4200 proceeds to step 4217.

Step 4217 of the present invention inquires whether an error arises with the active list of pointers. If an error does arise, flowchart 4200 returns to step 4214. If an error does not arise, flowchart 4200 proceeds to step 4218. Step 4217 is effective if a newly created active list contains an error and the previous active list does not contain an error and has not been overwritten by the new active list. In this manner, the present invention provides a backup of an original controller configuration that can be utilized if an error occurs. Thus, the present invention provides robustness in its use of a configurable controller. Step 4217 is an optional step used to enhance the effectiveness of software-based allocation and scheduling. If a given hardware resource has a failure, then its use in the software based allocation/scheduling table can be modified to essentially eliminate it, and thus allow commutation device 100a to continue operation. This alterative can be implemented by turning off all virtual uses of the physical resource via column 286 in FIG. 3D.

Step 4218 of the present invention inquires whether the operation is terminated. Step 4218 provides for a hard restart, re-initialization, or some other power down of the communication device. If the operation is terminated, then flowchart 4200 ends. However, if operation is not terminated, then flowchart 4200 returns to step 4206.

While the present embodiment applies flowcharts 4000, 4100, and 4200 to a digital wireless communication system, the present invention can be applied to any electronic device for any type of application. Within the wireless communication system described in the present embodiment, the present invention is applicable to mobile units, base stations, and test platforms. Furthermore, while flowcharts 4000, 4100, and 4200 of the present embodiment show a specific sequence and quantity of steps, the present invention is suitable to alternative embodiments. For example, not all the steps provided in the aforementioned flowcharts are required for the present invention. Similarly, other steps may be omitted depending upon the application. In contrast, the present invention is well suited to incorporating additional steps to those presented, as required by an application, or as desired for permutations in the process. Lastly, the sequence of the steps for flowcharts 4000, 4100, and 4200 can be modified depending upon the application. Thus, while the present flowcharts are shown as a single serial process, they can also be implemented as a continuous or parallel process. For example, is appreciated that the present flowcharts can be repeated for each of multiple flexible schedulers in a given electronic device, e.g., three flexible schedulers 102a, 106a, and 110a of communication device 100a shown in FIG. 1A.

Many of the instructions for the steps, as well as the data input and output from the steps of flowcharts 4000 and 4200 utilize memory and processor hardware components, e.g. system memory 120 and processor 130 in FIG. 1A. A similar scenario exists for flowchart 4100 with respect to local memory 210 and local controller or processor 214 of computer 202 shown in FIG. 2B. The memory storage used to implement the flowchart steps in the present embodiment can either be permanent, such as read only memory (ROM), or temporary memory such as random access memory (RAM). Memory storage can also be any other type of memory storage, capable of containing program instructions, such as a CD ROM, or flash memory, etc. Similarly, the processor used to implement the flowchart steps can either be a dedicated controller, an existing system processor, or it can be a dedicated digital signal processor (DSP), as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "locating," "transmitting," "reading," "repeating," "returning," "receiving," "generating," "associating," "operating," "implementing," "overwriting," "controlling," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments described herein, the present invention has been shown to provide a method and apparatus that coordinates, via allocation and scheduling, a wide range of hardware resources in an electronic communication device in a real time manner to accommodate a continual real-time flow of input data into the communication device and the resultant processed output data. Additionally, the embodiments show how the present invention overcomes the limited flexibility of an ASIC controller in order to accommodate the variation in hardware resources and uses for the wide range of spread spectrum communication systems. The present invention also overcomes the effects of fragmenting hardware resources and the inefficient use of hardware resources, system interruptions, system crashes, and compounded fragmenting due to the dynamically changing environment. And the present invention accommodates a dynamically changing environment while overcoming the limitation of comprised integrity of the system for processes that have not changed. Additionally, the present invention provides a method and apparatus of controlling hardware resources that provides user control and flexibility without the associated complexities and problems. Finally, the present invention overcomes the limitations of inefficient manage the hardware resources in terms of power consumption.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of dynamically implementing changes for scheduling at least one hardware resource of a wireless communication device, comprising the steps of:
   a) receiving a first list of addresses associated with the at least one hardware resource, the first list of addresses listing active operation information for the at least one hardware resource;
   b) receiving a second list of addresses associated with the at least one hardware resource, the second list of addresses listing backup operation information for the at least one hardware resource;
   c) receiving a request to modify an operation of the at least one hardware resource in a given category;
   d) modifying the second list of addresses to reflect the request to modify the operation of the at least one hardware resource;
   e) exchanging the active/backup status of the first list of addresses and the second list of addresses;
   f) duplicating the active second address list as replacement for the backup first list of addresses; and
   g) operating the at least one hardware resource according to the modified active-status second list of addresses.

2. An apparatus for dynamically implementing changes for scheduling at least one hardware resource in a wireless communication device comprising:
   memory means for receiving and storing a first list of addresses associated with the at least one hardware resource, the first list of addresses listing active operation information for the at least one hardware resource;
   memory means for receiving and storing a second list of addresses associated with the at least one hardware resource, the second list of addresses listing backup operation information for the at least one hardware resource;
   controller means for receiving a request to modify an operation of the at least one hardware resource in a given category;
   said controller means operating for:
   modifying the second list of addresses to reflect the request to modify the operation of the at least one hardware resource;
   exchanging the active/backup status of the first list of addresses and the second list of addresses;
   duplicating the active second address list as replacement for the backup first list of addresses; and
   operating the at least one hardware resource according to the active modified second list of addresses.

* * * * *